US006464412B1

(12) United States Patent
Stoebe et al.

(10) Patent No.: US 6,464,412 B1
(45) Date of Patent: Oct. 15, 2002

(54) APPARATUS AND METHOD FOR RADIANT THERMAL FILM DEVELOPMENT

(75) Inventors: Timothy W. Stoebe, Eagan, MN (US); Mark E. Irving, Rochester, NY (US); David H. Levy, Rochester, NY (US); Kevin W. Williams, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/571,758

(22) Filed: May 15, 2000

(51) Int. Cl.[7] ......................... G03D 13/00; G03B 27/52

(52) U.S. Cl. ....................... 396/575; 396/567; 396/578; 355/27; 355/40; 358/487; 358/506

(58) Field of Search ................................ 396/315, 319, 396/567, 575, 578; 355/27, 28, 40; 358/487, 506; 430/617; 219/216

(56) References Cited

U.S. PATENT DOCUMENTS

| | | | | |
|---|---|---|---|---|
| 4,021,240 | A | | 5/1977 | Cerquone et al. |
| 4,148,575 | A | | 4/1979 | Siryj |
| 4,198,145 | A | | 4/1980 | Scott |
| 4,278,338 | A | * | 7/1981 | Baker et al. ................ 396/575 |
| 4,550,245 | A | | 10/1985 | Arai et al. |
| 4,771,728 | A | | 9/1988 | Bergman, Jr. |
| 4,994,642 | A | | 2/1991 | Matsumoto et al. |
| 5,164,571 | A | | 11/1992 | Asaoka et al. |
| 5,223,883 | A | | 6/1993 | Suzuki |
| 5,444,217 | A | | 8/1995 | Moore et al. |
| 5,587,767 | A | | 12/1996 | Islam et al. |
| 5,634,167 | A | | 5/1997 | Islam et al. |
| 5,698,365 | A | | 12/1997 | Taguchi et al. |
| 6,048,110 | A | | 4/2000 | Szajewski et al. |
| 6,062,746 | A | | 5/2000 | Stoebe et al. |
| 6,278,510 | B1 | * | 8/2001 | Stoebe et al. ................. 355/27 |

FOREIGN PATENT DOCUMENTS

| | | |
|---|---|---|
| DE | 19956524 | 6/2000 |
| EP | 0 741 327 A1 | 11/1996 |
| EP | 1 008 901 A1 | 6/2000 |
| GB | 2 318 645 A | 4/1998 |

OTHER PUBLICATIONS

Research Disclosure #17029, Jun. 1978, pp. 9–15.
Research Disclosure #29963, Mar. 1989, pp. 8–14.

* cited by examiner

*Primary Examiner*—Alan A. Mathews
(74) *Attorney, Agent, or Firm*—Paul A. Leipold; Lynne M. Blank

(57) ABSTRACT

The invention relates to an apparatus for radiant thermal development of photothermal film comprising a receiving chamber for a film cartridge, drive means to advance thermal film from said film cartridge and rewind film into said film cartridge, an accumulator to gather said film after it has left the cartridge, a source of radiant energy, a guiding means to guide said radiant energy to develop said thermal film as said thermal film passes between said cartridge and said accumulator, a radiant energy absorbing material incorporated into said photothermal film, and a lighttight container for said chamber, heater, and accumulator.

47 Claims, 4 Drawing Sheets

APPARATUS AND METHOD FOR RADIANT THERMAL FILM DEVELOPMENT

FIELD OF THE INVENTION

The present invention relates to a method and apparatus for processing thermally developable film. It particularly relates to a compact apparatus and method for developing film by applying radiant heat to the film.

BACKGROUND OF THE INVENTION

In the conventional practice of color photography, silver halide film is developed by a chemical technique, requiring several steps consisting of latent image development, bleaching, and fixing. While this technique has been developed over many years and results in exceptional images, the technique requires several liquid chemical solutions and precise control of times and temperatures of development. Further, the conventional silver halide chemical development technique is not particularly suitable for utilization with compact developing apparatus. The chemical technique also is not easily performed in the home or small office.

Imaging systems that do not rely on conventional wet processing have received increased attention in recent years. Photothermographic imaging systems have been employed for producing silver images. Typically, these imaging systems have exhibited very low levels of radiation-sensitivity and have been utilized primarily where only low imaging speeds are required. The most common use of photothermographic elements is for copying documents and radiographic images. A method and apparatus for developing a heat developing film is disclosed in U.S. Pat. No. 5,587,767—Islam et al. Summaries of photothermographic imaging systems are published in *Research Disclosure*, Vol. 170, June 1978, Item 17029, and Vol. 299, March 1989, Item 29963. Thermally developed films have not been generally utilized in color photography. However, heat development color photographic materials have been disclosed, for example, in U.S. Pat. No. 4,021,240—Cerquone et al and U.S. Pat. No. 5,698,365—Taguchi et al, and commercial products such as Color Dry Silver supplied from Minnesota Mining and Manufacturing Co. and PICTROGRAPHY® and PICTROSTAT® supplied by Fuji Photo Film Co., Ltd. have been put on the market. Furthermore, U. K. Publication 2,318,645 discloses an imaging element capable of providing a retained viewable image when imagewise exposed and heated. It is proposed that such an element could comprise a color thermal film for photography that delivers satisfactory pictures.

The importance of information such as film type, film speed, film exposure information, and information relevant to the processing and subsequent use (e.g. printing or optical scanning) of the film is well understood. Virtually transparent magnetic layers or stripes on film provide a means to record such information. These magnetic layers or stripes provide for the recording of information during film manufacture, reading and/or recording of information during camera use, and reading and/or recording information during subsequent processing or optical scanning. Film containing a magnetic layer that allows recording of information during manufacture, exposure, and development is disclosed in U.S. Pat. No. 5,215,874—Sakakibara. There is a need to read and write magnetic data on thermographic film associated with the thermal processing. Reading and writing information on a magnetic coating or stripe on thermographic film requires solutions to problems different than those encountered in other apparatus. For example, the thermal development conditions may degrade and potentially erase the magnetic information stored on the film. There is therefore a need to read and store the magnetic information so that it may be rewritten onto the film after thermal processing.

The function of a film scanner is to measure optical density at many points on the film being scanned. The density of each pixel, or smallest region of the film being sensed, is measured by illuminating the region with light of a known light intensity and measuring the intensity of the light which is transmitted through the film. Color scans require measuring transmitted light intensity over known spectral bands. Such techniques are disclosed in U.S. Pat. No. 684,610—Brandestini et al. The transmitted light intensity may be measured electronically and the electronic record of the transmitted light may be digitized and stored as an electronic file representation of the film image.

The importance and utility of an electronic record of film images is widely known in the art. The electronic file may be easily duplicated and extensively manipulated. Color balance and tone scale may be adjusted. Sharpening and other algorithms to alter image structure may be applied. Annotations and/or graphical elements may be added to the film image data file. The scene may be easily cropped and digitally zoomed. An electronic record of a film image may be easily transmitted and communicated through existing electronic communication networks. The electronic record of a film image may also be output to a variety of output devices including ink-jet and thermal wax digital printers. The electronic record may also be manipulated and stored in mass storage devices for rapid retrieval and subsequent processing. There is a need to optically scan thermographic film to provide an electronic file record of the film image information.

Optical writing of sensitometric tables and test patches onto conventional wet processed film to improve imaging system performance are known in the art. Such techniques are disclosed in U.S. Pat. No. 5,667,944—Reem et al. Optical writing of calibrated tablets and patches onto unexposed portions of film is of significant utility. Inspection of processed calibrated tablets or patches allows the processing conditions to be optimized for the remainder of the film strip. Furthermore, analysis of the calibrated tablets or patches allows printing and/or scanning algorithms to be refined to achieve an advantaged print or more useful electronic record of the film image data. For example, tone scale and color balance may be corrected and adjusted based on data obtained from calibrated tablets or patches. Optical writing provides a means to store other information on the film such as data associated with processing or scanning conditions. Optical writing also allows information to be written onto exposed regions of the film. For example, a time and date stamp that is readily apparent in a print may be written onto the film at the time of processing. Furthermore, by controlling the optical writing, graphical elements may be added to the original scene prior to processing. There is a need to provide for optical printing onto thermally developable film.

Thermal processing of photothermographic film may be provided by a conductive, convective, or radiant heating element. Conductive heating elements require physical contact between the heater and the film element which may lead to undesirable fouling or scratching of the film. Fouling or scratching of the film degrades the ultimate image quality and may result in unacceptable images. Non-conductive heating elements may largely avoid the problems of scratching and fouling by avoiding direct physical contact between the heating element and the film. Non-conductive heating elements include convective and radiant heaters. Convective heaters typically use heated gas to transfer heat to an object. Convective film heaters have been disclosed, for example, in U.S. Pat. No. 4,148,575—Siryj and U.S. Pat. No. 4,198, 145—Scott. Radiant heaters provide radiant energy that must be absorbed by an object to heat the object. Radiant heaters are applied in a number of processes. For example, radiant heat system to aid semiconductor wafer processing are disclosed in U.S. Pat. No. 5,444,217—Moore et al and U.S. Pat. No. 4,550,245—Tetsuji et al. Radiant heat systems for drying and curing coatings are disclosed in U.S. Pat. No. 4,771,728—Bergman and U.S. Pat. No. 5,164,571—Asaoko et al. U.S. Pat. No. 5,223,883—Suzuki discloses a radiant heating means to dry photographic film after wet processing. Radiant heating means to develop digital film for xerography has been disclosed in U.S. Pat. No. 5,587,767—Islam et al.

Radiant heating of color photothermographic film is distinct from the radiant heating systems described above and requires new solutions to different problems. Thermal film is light sensitive prior to processing. Exposure to radiant energy comprising wavelengths in which the photothermographic element is sensitive will fog the film and must be avoided to produce acceptable images. Furthermore, conventional film formulations are typically largely transparent in the spectral regions where radiant heaters are expected to operate most efficiently leading to inefficient energy transfer between the radiant heater and the film. Absorbing materials may be incorporated into the photothermographic film to promote efficient energy transfer by producing spectral bands of high absorption. Optimal energy transfer occurs if the spectral bands of high absorption are chosen to coincide with the output spectra of the radiant heater. These bands of high absorption should not interfere with the spectral bands where imaging occurs or image quality will be degraded. Absorbing materials useful to this invention have been disclosed, for example, in U.S. Pat. No. 4,973,572—DeBoer, U.S. Pat. No. 4,948,777—Evans et al, U.S. Pat. No. 4,950,640—Evans et al, and U.S. Pat. No. 4,942,141—Deboer et al.

For the foregoing reasons, there exists a need for a photothermographic film processor that utilizes a radiant heater to avoid scratching or fouling the film by avoiding direct physical contact with the film. In addition there exists a need for a radiant film processor that does not fog the film. There also exists a need for a radiant film processor that promotes efficient energy transfer to the film by emitting radiation in spectral bands where the photothermographic film element strongly absorbs such radiation.

PROBLEM TO BE SOLVED BY THE INVENTION

There is a need for a compact thermal film development system with the capability to heat the film without contacting the film. There is a need for a thermal film development system with the capability to provide efficient energy transfer from the radiant heat element to the film. There is a need for a compact radiant thermal film development system that does not fog the thermal film. There is a need for a compact thermal development film system with the capability to scan the thermally developable film. There is a need for a compact thermal development film system with the capability to write optical information onto thermally developable film. There is also a need for a compact thermal development film system with the capability to read and write magnetic information on the film.

SUMMARY OF THE INVENTION

It is an object of the invention to overcome disadvantages of prior apparatus and processes for thermal film and the complicated, awkward procedures for wet-processing conventional films.

It is another object to provide heat to the film without physical contact between the heating element and the film.

It is another object to provide efficient energy transfer between the heating element and the film.

It is another object to provide efficient radiant heat to the film without substituted fogging of the film.

It is another object to provide a means to scan the thermal film.

It is another object to provide a means to write optical information on the thermal film.

It is a further object to provide a means to read and write magnetic information associated with the thermal processing on the thermal film.

It is a further object to provide more convenient and rapid processing of thermal film to the individual user.

These and other objects of the invention are accomplished by an apparatus for radiant thermal development of photothermal film comprising a receiving chamber for a film cartridge, drive means to advance thermal film from said film cartridge and rewind film into said film cartridge, an accumulator to gather said film after it has left the cartridge, a source of radiant energy, a guiding means to guide said radiant energy to develop said thermal film as said thermal film passes between said cartridge and said accumulator, a radiant energy absorbing material incorporated into said photothermal film, and a lighttight container for said chamber, heater, and accumulator.

ADVANTAGEOUS EFFECT OF THE INVENTION

The invention provides a compact, convenient apparatus and method for processing of film contained in a film cartridge. It provides a radiant heating apparatus and a method of processing of color photothermal films without physical contact that is efficient, convenient, and compact. It provides a means to scan the thermal film to form an electronic record of image data that may be readily processed, printed, and transmitted. It provides a means to write optical information to alter film image frames and to facilitate optimal thermal processing and scanning by writing sensitometric tables. It also provides a means to record and write magnetic information to effect optimal subsequent processing.

DETAILED DESCRIPTION OF THE INVENTION

The invention has numerous advantages over prior methods of processing thermal film, particularly thermal film provided with means to store magnetic information contained in film cartridges. The system of the invention has the advantage that the individual user of thermal film cartridges may process the cartridges in a convenient and low-cost system. The apparatus of the invention has the advantage that magnetic information may be sensed and written on to the film. This information may be used to control subsequent processing or optical scanning. The invention has the advantage that it provides an optical writer to write optical information onto the thermal film. The invention has the advantage that it provides an optical scanner to create an electronic file record of film image information. The invention further has the advantage that it provides a means that is easily connected to a personal computer for control and development of thermal film. The invention has the advantage that it provides a radiant means of non-contact heating that does not fog thermal film. The invention provides an apparatus that is low in power requirements, while producing rapid developing for the individual user. The invention provides an apparatus and method that is easily transported. These and other advantages will be apparent from the detailed description below.

Figure 1:
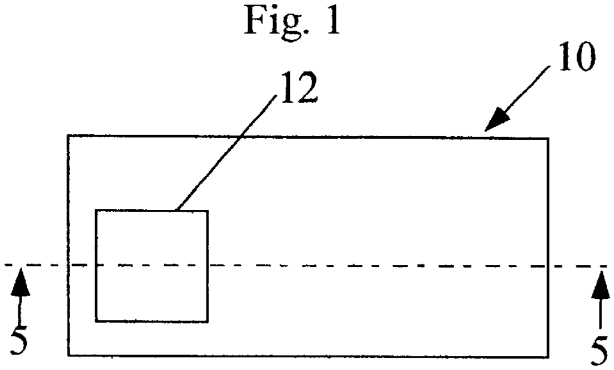
FIG. 1 is a top view of compact thermal development apparatus of the invention.
Figure 2:
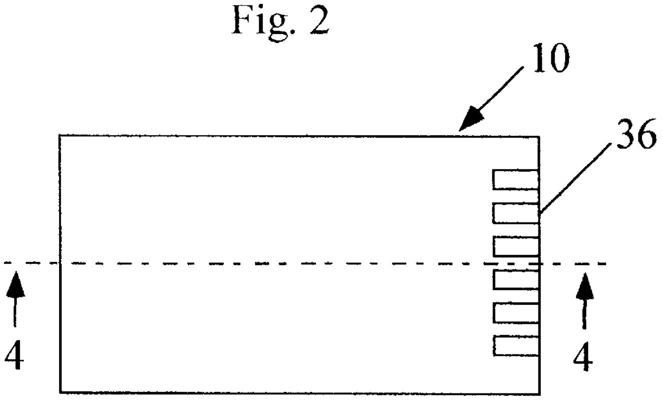
FIG. 2 is a side view of the apparatus of the invention.
Figure 3:
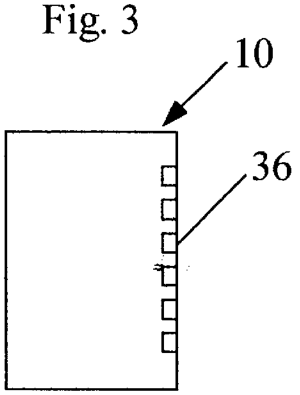
FIG. 3 is an end view of the apparatus of the invention.
Figure 4:
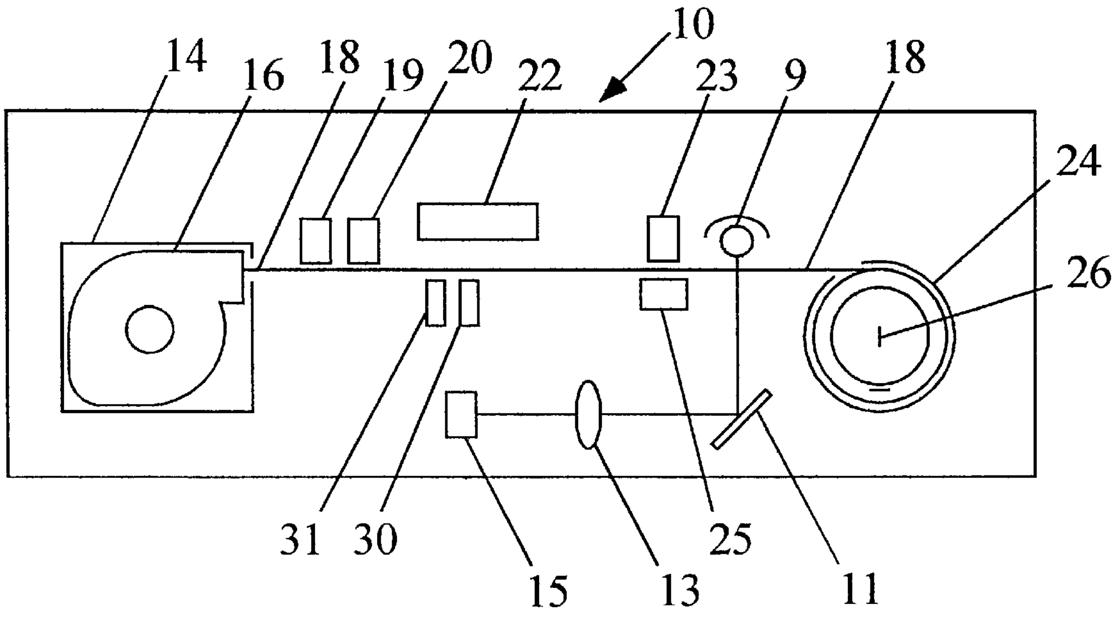
FIG. 4 is a cross-sectional view on line 4—4 of FIG. 2.
Figure 5:
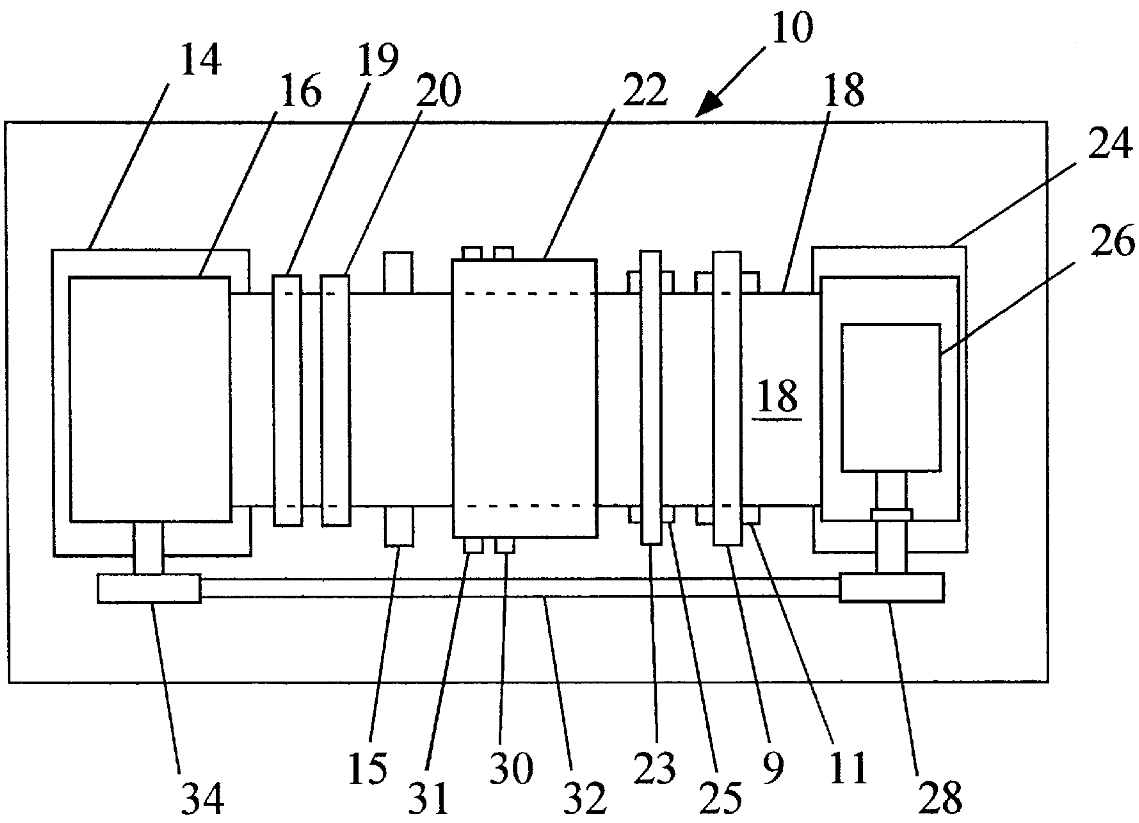
FIG. 5 is a cross-sectional view on line 5—5 of FIG. 1.

As illustrated in FIGS. 1, 2, and 3, there is provided compact development apparatus device 10. The apparatus 10 is lighttight so that the thermal film is not exposed to light prior to the thermal development. The apparatus has a lighttight door 12 for opening and inserting a film cartridge. The apparatus 10 further is provided with electrical contacts 36 for providing power and control to the apparatus. As shown in FIG. 4, the device 10 contains a chamber 14 for accepting the film cartridge 16. The film cartridge as it is unwound has film 18 pass into accumulator 24. The film 18 is then wound onto accumulator 24. Accumulator 24 is driven by motor 26 located within accumulator 24. In FIG. 5, the drive for cartridge 16 is shown to be transmitted from motor 26. Motor 26 transfers through driven sprocket 28 through a series of gears 32 to sprocket 34 that simultaneously drives film from film cartridge 16 as it is wound into accumulator 24. As the film 18 passes between the film cartridge 16 and accumulator 24, it passes a radiant energy source 22, a temperature sensor 31, and a photodetector 30. As the film 18 passes between the film cartridge 16 and accumulator 24, it passes over a magnetic reading head 19 and a magnetic writing head 20. In FIG. 4, the film 18 is shown to pass between a light source 9 and a mirror 11 as the film 18 is advanced between the film cartridge 16 and accumulator 24. In the case where multiple radiant energy sources arc utilized to effectuate thermal film processing, radiant energy source 22 as shown would necessarily be multiplexed into an array of radiant energy sources.

A typical scanning apparatus utilizes a light source to provide illumination and an optical detector to determine the optical density of the film by measuring the intensity of the light transmitted through the film. An imagewise scan of a film image frame may be obtained by using an appropriate light source and a linear detector array that scans the entire width of the film as the film is driven lengthwise across the scanning apparatus. In FIG. 4, the film 18 is shown to pass between a light source 9 and a mirror 11 as the film 18 is advanced between the film cartridge 16 and accumulator 24. The light generated by light source 9 and transmitted through the film 18 is reflected by mirror 11 and focused by lens system 13 to be detected by optical detector 15. The electronic record of the film image data may be created by recording the output of the optical detector in relation to the relative position of the film image frame and the optical scanner. In FIG. 4, the film 18 is also shown to pass between a light source 23 and photodetector 25. Light source 23 may be controlled to write optical information onto the film. Photodetector 25 may be used to calibrate light source 23 to provide a known exposure of the film 18.

Figure 6:
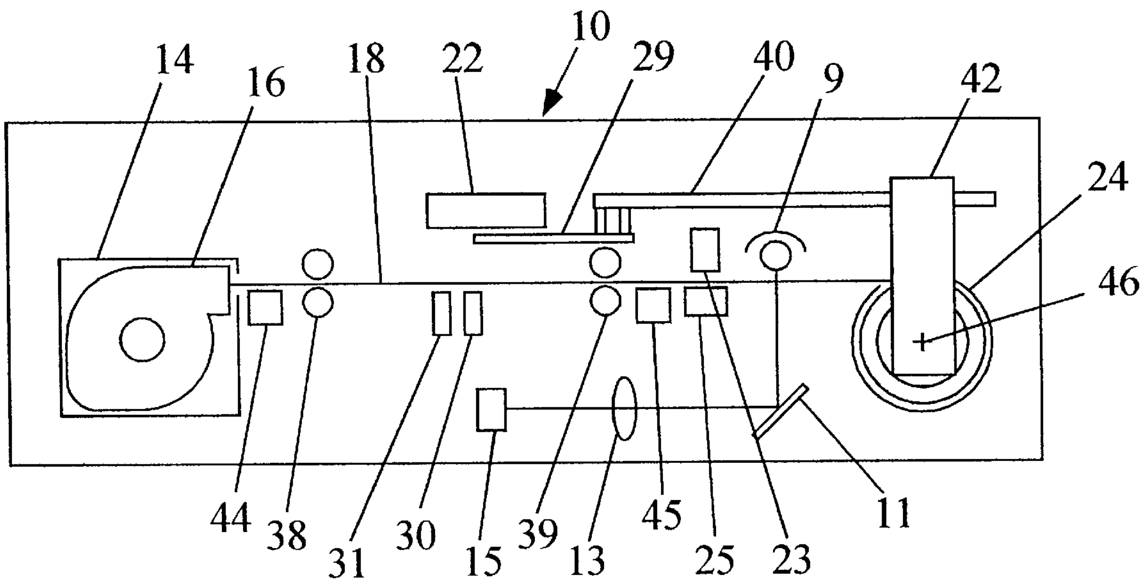
FIG. 6 is an alternative cross-sectional view on line 4—4 of FIG. 2 showing means to insert a shield between the radiant heater and the film path.

In FIG. 6, the film 18 is shown to pass through guide rollers 38 and 39, and a shield 29 for the radiant energy source 22 is shown to be supported by an armature 40 that may be actuated by a motor 46 located within the accumulator 24 through an assembly of gears 42 to translate the shield 29 to control the exposure of the film 18 to radiant energy from source 22. In the case of multiple radiant energy sources, this shield may have an aperture or slot opening to select an appropriate radiant energy source. The mechanism is constructed to actuate the armature in response to preset conditions or in response to signals provided by sensors 44 and 45. Sensors 44 and 45 are designed to monitor a plurality of parameters including film speed, film location, temperature, frame advancement, extent of thermal development and fault conditions such as film breakage, film jam, and heater malfunction.

The radiant energy source 22 utilized in the apparatus of the invention may be any suitable type of radiant energy source. Radiant energy sources have the advantage that they do not require direct physical contact with the film to heat the film. Direct physical contact is disadvantageous because direct physical contact may lead to scratching or fouling of the film. Radiant energy sources have the efficiency advantage that they may provide energy that is primarily absorbed only by the film so that little energy is wasted on other surroundings. Radiant energy sources further have the advantage that the radiant energy output can be focused and directed to effect localized development of thermal film and write optical information onto the thermal film. Preferred for the apparatus of the invention are radiant energy sources that emit radiant energy primarily at infrared (IR) wavelengths Infrared wavelengths include wavelengths substantially longer than 700 nm and substantially shorter than 1 cm. Radiant energy sources that emit radiation primarily at IR wavelengths are preferred because IR radiation is more efficient at transferring thermal energy and heat than other forms of radiant energy. Thermal film is typically light sensitive in the blue (400 to 500 nm) green (500 to 600 nm) and red (600 to 700) spectral bands. Excessive non-imagewise exposure to radiation in these spectral bands will fog the film and destroy any latent image information. Radiant energy sources that emit radiation primarily at IR wavelengths are therefore also preferred because IR radiation will not fog typical thermal film. Furthermore, IR radiant energy sources are relatively easy to produce and operate at high efficiency. Examples of radiant energy sources that can be made to emit primarily IR radiation include ceramic glo-bar sources, black body radiators, filtered incandescent radiators, lasers, and diode lasers. In one embodiment, conductive or convective heating means may be used to heat the thermal film in addition to the radiant heat source or sources.

Since filtering typically involves absorption of unwanted wavelengths, it is inefficient. Sources of radiant energy that do not require substantial filtering are preferred. Radiant energy sources that exhibit sharply peaked emission spectra are preferred and have the advantage that they concentrate radiant power over narrow spectral bands and are therefore less likely to fog the thermal film. Radiant energy sources that exhibit sharply peaked emission spectra further have the advantage that they provide high power over narrow spectral bands that may be efficiently absorbed by an absorbing media to provide heat to the thermal film. Radiant energy sources that exhibit rapid response times have the advantage that they may be pulsed on and off to control the radiant power output. Rapid response times also allow for short warm up and cool down times and increase efficiency. Laser diode radiant energy sources are preferred for the apparatus of the invention. Laser diode radiant energy sources provide sharply peaked emission spectra and high radiant power at IR wavelengths. Laser diode radiant energy sources are compact and may be switched on and off rapidly. Laser diode radiant energy sources may be found that do not require substantial filtering to avoid fogging the thermal film. Laser diode radiant energy sources may be focused and directed to effect localized development of thermal film and write information onto thermal film.

The energy supplied by the radiant energy source must be absorbed by the thermal film to effectively heat the thermal film. While high absorption is preferred, typical color negative film exhibits low absorption of IR radiant energy. Radiant energy absorbing media may be incorporated into the thermal film to increase energy transfer efficiency. The radiant energy absorbing media may be any suitable sort. Examples of suitable absorbing media include IR absorbing pigments or organic dyes. Absorbing media that absorb only IR radiant energy have the advantage that they may not substantially interfere with the imaging functions of the thermal film. Absorbing media that absorb IR radiant energy further have the advantage that they promote efficient energy transfer from a source of IR radiation to effectively heat the thermal film. Absorbing media are preferred that exhibit high absorption coefficients to promote efficient energy transfer and reduce the loading of the absorbing media into the film. IR absorbing media are also preferred that exhibit high absorption over narrow spectral bands to match the emission spectra of the preferred radiant energy source to provide efficient energy transfer while minimizing interference with the imaging functions of the thermal film. Examples of suitable IR absorbing materials is provided in Examples 1 and 2 below as IR Absorber Dyes (13)–(17). While these IR absorber dyes are suitable materials for absorbing IR radiation in these examples, other materials or combinations of materials may be used to effect suitable absorption of IR radiation.

The radiant energy absorbing material may be any media that is not substantially degraded through the thermal process of the thermal film and absorbs infrared radiation. Typical thermal process conditions comprise heating up to 180° C. for approximately between 2 and 30 seconds per image frame. The radiant energy absorbing media may be distributed uniformly within the thermal film element or it may be localized to specific regions within the thermal film element. A preferred embodiment includes localizing the radiant energy absorbing media to one or several layers within the thermal film element. The radiant energy absorbing media may also be incorporated into the supporting film base. Organic IR absorbing dyes may be synthesized to be soluble in water or oil. Water soluble organic IR absorbing dyes may be incorporated uniformly into the gelatin matrix of the film. Oil soluble IR absorbing organic dyes may be codispersed with other compounds so that the absorbed radiant energy and heat is initially localized to particular chemical compounds or groups of chemical compounds. Pulsing the radiant energy source may effectively localize the heat and thermal development to regions in close proximity to the IR absorbing media.

The thermal film utilized in the invention may be any film that provides satisfactory images. Typical films are full color thermal films such as disclosed in U.S. Pat. No. 5,698,365—Taguchi et al. A typical film provides light sensitive silver halides, compounds that form dyes, compounds that release dyes, couplers as dye donating compounds, reducing agents, and binders on supports. A typical film may also contain organic metal salt oxidizing agents and antifoggants. Other components may be included as known in the photographic and photothermographic art. These components may be added in the same layers or in separate layers over the film base. A wide range of colors may be obtained by using in combination at least three silver halide emulsion layers, each having light sensitivity in different spectral regions. The thermal film can be provided with various supplementary layers such as protective layers, undercoat layers, intermediate layers, antihalation layers, and back layers. The respective layers can be variously disposed as known in the usual color photographic materials. Filter dyes may be included in, some layers.

Light sensitive elements or films useful in the practice of this invention are supplied in film cassettes or thrust cartridges. Thrust cartridges are preferred for the apparatus of the invention as thrust cartridges do not require a secondary mechanical means to extract the film leader from within the cartridge as do common 35 mm film cartridges once the 35 mm film has been rewound completely into the cartridge. The thrust cartridge may be any cartridge that allows film to be withdrawn from the cartridge and rewound into the cartridge multiple times while providing lighttight storage, particularly prior to exposure and development. Typical of such cartridges are those utilized in the advanced photo system (APS) for color negative film. These cartridges are disclosed in U.S. Pat. No. 4,834,306—Robertson et al and U.S. Pat. No. 4,832,275—Robertson. Thrust cartridges are further disclosed by Kataoka et al U.S. Pat. No. 5,226,613; by Zander U.S. Pat. No. 5,200,777; by Dowling et al U.S. Pat. No. 5,031,852; and by Pagano et al U.S. Pat. No. 5,003,334. These thrust cartridges may be employed in reloadable cameras designed specifically to accept such film cassettes, in cameras fitted with an adapter designed to accept such film cassettes or in one time use cameras designed to accept such cassettes. Narrow bodied one-time-use cameras suitable for employing thrust cartridges are described by Tobioka et al U.S. Pat. No. 5,692,221. While the film may be mounted in a one-time-use camera in any manner known in the art, it is especially preferred to mount the film in the one-time-use camera such that it is taken up on exposure by a thrust cartridge. While thrust cartridges are preferred in some embodiments of the apparatus of the invention, other types of film cartridges may also be used to effect suitable means for storing and supplying the film.

Elements having excellent light sensitivity are best employed in the practice of this invention. The elements should have a sensitivity of at least about ISO 50, preferably have a sensitivity of at least about ISO 200, and more preferably have a sensitivity of at least about ISO 400. Elements having a sensitivity of up to ISO 3200 or even higher are specifically contemplated. The speed, or sensitivity, of a color negative photographic element is inversely related to the exposure required to enable the attainment of a specified density above fog after processing. Photographic speed for a color negative element with a gamma of about 0.65 in each color record has been specifically defined by the American National Standards Institute (ANSI) as ANSI Standard Number PH 2.27–1981 (ISO (ASA Speed)) and relates specifically the average of exposure levels required to produce a density of 0.15 above fog in each of the green light sensitive and least sensitive color recording unit of a color film. This definition conforms to the International Standards Organization (ISO) film speed rating. For the purposes of this disclosure, if the color unit gammas differ from 0.65, the ASA or ISO speed is to be calculated by linearly amplifying or deamplifying the gamma vs. log E (exposure) curve to a value of 0.65 before determining the speed in the otherwise defined manner.

The elements useful in this invention comprise at least one incorporated developing agent which may be supplied in a blocked or unblocked form as known in the art. When supplied in a blocked form, the blocked developing agent is unblocked on heating as known in the art. Classes of useful developing agents include aminophenols, paraphenylene diamines and hydrazides all as known in the art. Classes of useful blocked developing agents include sulphonamidophenols, carbonamidophenols, carbamylphenols, sulphonamidoanalines, carbonamidoanalines, carbamylanalines, sulphonylhydrazines, carbonylhydrazines, carbamylhydrazines, and such. Multiple distinct developing agents can be employed. On heating the developing agent reacts with incorporated oxidant to form oxidized developer. The oxidized developer then reacts with a color forming agent to form a non-diffusing dye. In one embodiment, the oxidixed developer reacts with a chromogenic coupler to form a non-diffusing dye. In another embodiment the oxidized developer reacts with a leuco-dye to form a non-diffusing dye. In yet another embodiment, the oxidized developer reacts with a color-free dye precursor to liberate a non-diffusing colored dye, all as known in the art. The incorporated oxidant may be any oxidant suitable for reacting with the reduced form of a color developing agent. In one embodiment, the sensitized silver halide may serve as the incorporated oxidant. In a preferred embodiment, a distinct metal salt may serve as the incorporated oxidant. In this latter case, organic silver salts as known in the art are preferred. Silver behenate, silver benzotriazole derivatives, silver acetylide derivatives and silver aminoheterocycle derivatives are specifically preferred classes of incorporated oxidants. The element may also include a pH altering base or base precursor as known in the art. Further, the element may include an auxiliary developer or electron transfer agent as known in the art. Specific useful species are described by Taguchi et al in U.S. Pat. No. 5,698,365 already cited.

A typical color film construction useful in the practice of the invention is illustrated by the following:

Element SCN-1

SOC Surface Overcoat

BU Blue Recording Layer Unit

IL 1 First Interlayer

GU Green Recording Layer Unit

IL 2 Second Interlayer

RU Red Recording Layer Unit

AHU Antihalation Layer Unit

S Support

SOC Surface Overcoat

The support S can be either reflective or transparent, which is usually preferred. When reflective, the support is white and can take the form of any conventional support currently employed in color print elements. When the support is transparent, it can be colorless or tinted and can take the form of any conventional support currently employed in color negative elements, e.g., a colorless or tinted transparent film support so long as it otherwise has the strength and thermal stability properties described above. Details of support construction are well understood in the art. The support is thin enough to enable loading of long lengths in rolled form, while maintaining sufficient strength to resist deformation and tearing during use. The support is generally up to about 180 $\mu$m thick, preferably between 50 and 130 $\mu$m thick, and most preferably between 60 and 110 $\mu$m thick. The support and element flexibility will be such that the element can assume a radius of curvature of less than 12,000 $\mu$m, and preferably less than 6,500 $\mu$m, or even less. Elements useful without cracking or other physical deformity at a radius of curvature of 1,400 $\mu$m or even lower are contemplated. When the element is supplied in cartridge form, the cartridge may enclose a light sensitive photographic element in roll form and a housing for protecting the film element from exposure and an opening for withdrawing the element from the cartridge receptacle. Transparent and reflective support constructions, including subbing layers to enhance adhesion, are disclosed in *Research Disclosure*, Item 38957, cited above, XV. Supports.

Each of blue, green, and red recording layer units BU, GU and RU is formed of one or more hydrophilic colloid layers and contain at least one radiation-sensitive silver halide emulsion and a color forming agent, including at least one dye image-forming agent. In the simplest contemplated construction each of the layer units consists of a single hydrophilic colloid layer containing emulsion and a color forming agent. When the a color forming agent present in a layer unit is coated in a hydrophilic colloid layer other than an emulsion containing layer, the color forming agent containing hydrophilic colloid layer is positioned to receive oxidized color developing agent from the emulsion during development. Usually the a color forming agent containing layer is the next adjacent hydrophilic colloid layer to the emulsion containing layer.

In order to ensure excellent image sharpness, and to facilitate manufacture and use in cameras, all of the sensitized layers are preferably positioned on a common face of the support. When in spool form, the element will be spooled such that when unspooled in a camera, exposing light strikes all of the sensitized layers before striking the face of the support carrying these layers. Further, to ensure excellent sharpness of images exposed onto the element, the total thickness of the layer units above the support should be controlled. Generally, the total thickness of the sensitized layers, interlayers and protective layers on the exposure face of the support are less than 35 $\mu$m. It is preferred that the total layer thickness be less than 28 $\mu$m, more preferred that the total layer thickness be less than 22 $\mu$m, and most preferred that the total layer thickness be less than 17 $\mu$m. This constraint on total layer thickness is enabled by controlling the total quantity light sensitive silver halide as described below, and by controlling the total quantity of vehicle and other components, such as a color forming agents, solvent, and such in the layers. The total quantity of vehicle is generally less than 20 g/m$^2$, preferably less than 14 g/m$^2$, and more preferably less than 10 g/m$^2$. Generally, at least 3 g/m$^2$ of vehicle, and preferably at least 5 g/m$^2$ of vehicle is present so as to ensure adhesion of the layers to the support during processing and proper isolation of the layer components. Likewise, the total quantity of other components is generally less than 12 g/m$^2$, preferably less than 8 g/m$^2$, and more preferably less than 5 g/m$^2$.

In another embodiment, the color forming layers may be applied to both sides of a support to form a duplitized film suitable for use in a camera all as described by Szajewski et al U.S. Pat. Nos. 5,744,290 and 5,773,205.

The emulsion in BU is capable of forming a latent image when exposed to blue light. When the emulsion contains high bromide silver halide grains and particularly when minor (0.5 to 20, preferably 1 to 10, mole percent, based on silver) amounts of iodide are also present in the radiation-sensitive grains, the native sensitivity of the grains can be relied upon for absorption of blue light. Preferably the emulsion is spectrally sensitized with one or more blue spectral sensitizing dyes. The emulsions in GU and RU are spectrally sensitized with green and red spectral sensitizing dyes, respectively, in all instances, since silver halide emulsions have no native sensitivity to green and/or red (minus blue) light. Blue-green and green-red sensitive emulsions may also be employed as known in the art. In this context, Blue light is light generally having a wavelength between 400 and 500 nm, Green light is light generally having a wavelength between 500 and 600 nm, and Red light is light generally having a wavelength between 600 and 700 nm.

Any convenient selection from among conventional radiation-sensitive silver halide emulsions can be incorporated within the layer units. Radiation-sensitive silver chloride, silver bromide, silver iodobromide, silver iodochloride, silver chlorobromide, silver bromochloride, silver iodochlorobromide, and silver iodobromochloride grains may be employed. The grains can be either regular or irregular (e.g., tabular). Tabular grain emulsions, those in which tabular grains account for at least 50 (preferably at least 70 and optimally at least 90) percent of total grain projected area are particularly advantageous for increasing speed in relation to granularity. To be considered tabular a grain requires two major parallel faces with a ratio of its equivalent circular diameter (ECD) to its thickness of at least 2. Specifically preferred tabular grain emulsions are those having a tabular grain average aspect ratio of at least 4 and, optimally, greater than 8. Preferred mean tabular grain thickness is less than 0.3 $\mu$m (most preferably less than 0.2 $\mu$m). Ultrathin tabular grain emulsions, those with mean tabular grain thickness of less than 0.07 $\mu$m, are specifically preferred. The grains preferably form surface latent images so that they produce negative images when processed in a surface developer. While any useful quantity of light sensitive silver, as silver halide, can be employed in the elements useful in this invention, it is preferred that the total quantity be less than 10 g/m$^2$ of silver. Silver quantities of less than 7 g/m$^2$ are preferred, and silver quantities of less than 5 g/m$^2$ are even more preferred. The lower quantities of silver improve the optics of the elements, thus enabling the production of sharper pictures using the elements. These lower quantities of silver are additionally important in that they enable rapid development and desilvering of the elements. Conversely, a silver coating coverage of at least 2 g of coated silver per m$^2$ of support surface area in the element is necessary to realize an exposure latitude of at least 2.7 log E while maintaining an adequately low graininess position for pictures intended to be enlarged. The green light recording layer unit is preferred to have a coated silver coverage of at least 0.8 g/m$^2$. It is more preferred that the red and green units together have at least 1.7 g/m$^2$ of coated silver and even more preferred that each of the red, green, and blue color units has at least 0.8 g/m$^2$ of coated silver. Because of its less favored location for processing, it is generally preferred that the layer unit located, on average, closest to the support contain a silver coating coverage of at least 1.0 g/m$^2$ of coated silver. Typically, this is the red recording layer unit. For many photographic applications, optimum silver coverages are at least 0.9 g/m$^2$ in the blue recording layer unit and at least 1.5 g/m$^2$ in the green and red recording layer units.

Illustrations of conventional radiation-sensitive silver halide emulsions are provided by *Research Disclosure*, Item 38957, cited above, Section I. Emulsion grains and their preparation. Chemical sensitization of the emulsions, which can take any conventional form, is illustrated in Section IV. Chemical sensitization. Spectral sensitization and sensitizing dyes, which can take any conventional form, are illustrated by Section V. Spectral sensitization and desensitization. The emulsion layers also typically include one or more antifoggants or stabilizers, which can take any conventional form, as illustrated by Section VII. Antifoggants and stabilizers.

BU contains at least one yellow dye image-forming agent, GU contains at least one magenta dye image-forming agent, and RU contains at least one cyan dye image-forming agent. Any convenient combination of conventional dye image-forming agents can be employed. Magenta dye-forming pyrazoloazole agents are particularly contemplated. Conventional dye image-forming agents are illustrated by *Research Disclosure*, Item 38957, cited above, X. Dye image formers and modifiers, B. Image-dye-forming couplers.

The remaining elements SOC, IL 1, IL2, and AHU of the element SCN-1 are optional and can take any convenient conventional form.

The interlayers IL 1 and IL 2 are hydrophilic colloid layers having as their primary function color contamination reduction, i.e., prevention of oxidized developing agent from migrating to an adjacent recording layer unit before reacting with dye-forming agent. The interlayers are in part effective simply by increasing the diffusion path length that oxidized developing agent must travel. To increase the effectiveness of the interlayers to intercept oxidized developing agent, it is conventional practice to incorporate an oxidized developing agent scavenger. When one or more silver halide emulsions in GU and RU are high bromide emulsions and, hence, have significant native sensitivity to blue light, it is preferred to incorporate a yellow filter, such as Carey Lea silver or a yellow processing solution decolorizable dye, in IL1. Suitable yellow filter dyes can be selected from among those illustrated by *Research Disclosure*, Item 38957, VIII. Absorbing and scattering materials, B. Absorbing materials. Antistain agents (oxidized developing agent scavengers) can be selected from among those disclosed by *Research Disclosure*, Item 38957, X. Dye image formers and modifiers, D. Hue modifiers/stabilization, paragraph (2).

The antihalation layer unit AHU typically contains a removable or decolorizable light absorbing material, such as one or a combination of pigments and dyes. Suitable materials can be selected from among those disclosed in *Research Disclosure*, Item 38957, VIII. Absorbing materials. A common alternative location for AHU is between the support S and the recording layer unit coated nearest the support.

The surface overcoats SOC are hydrophilic colloid layers that are provided for physical protection of the color negative elements during handling and processing. Each SOC also provides a convenient location for incorporation of addenda that are most effective at or near the surface of the color negative element. In some instances the surface overcoat is divided into a surface layer and an interlayer, the latter functioning as spacer between the addenda in the surface layer and the adjacent recording layer unit. In another common variant form, addenda are distributed between the surface layer and the interlayer, with the latter containing addenda that are compatible with the adjacent recording layer unit. Most typically the SOC contains addenda, such as coating aids, plasticizers and lubricants, antistats and matting agents, such as illustrated by *Research*

*Disclosure*, Item 38957, IX. Coating physical property modifying addenda. The SOC overlying the emulsion layers additionally preferably contains an ultraviolet absorber, such as illustrated by *Research Disclosure*, Item 38957, VI. UV dyes/optical brighteners/luminescent dyes, paragraph (1).

Instead of the layer unit sequence of element SCN-1, alternative layer units sequences can be employed and are particularly attractive for some emulsion choices. Using high chloride emulsions and/or thin (<0.2 $\mu$m mean grain thickness) tabular grain emulsions, all possible interchanges of the positions of BU, GU and RU can be undertaken without risk of blue light contamination of the minus blue records, since these emulsions exhibit negligible native sensitivity in the visible spectrum. For the same reason, it is unnecessary to incorporate blue light absorbers in the interlayers.

It is preferred to coat one, two, or three separate emulsion layers within a single dye image forming layer unit so as to obtain the requisite exposure latitude. When two or more emulsion layers are coated in a single layer unit, they are typically chosen to differ in sensitivity. When a more sensitive emulsion is coated over a less sensitive emulsion, a higher speed and longer latitude is realized than when the two emulsions are blended. When a less sensitive emulsion is coated over a more sensitive emulsion, a higher contrast is realized than when the two emulsions are blended. Triple coating, incorporating three separate emulsion layers within a layer unit, is a technique for facilitating extended exposure latitude, as illustrated by Chang et al U.S. Pat. Nos. 5,314,793 and 5,360,703.

When a layer unit is comprised of two or more emulsion layers, the units can be divided into sub-units, each containing emulsion and a color forming agent, that are interleaved with sub-units of one or both other layer units. The following elements are illustrative:

Element SCN-2

SOC Surface Overcoat

BU Blue Recording Layer Unit

IL1 First Interlayer

FGU Fast Green Recording Layer Sub-Unit

IL2 Second Interlayer

FRU Fast Red Recording Layer Sub-Unit

IL3 Third Interlayer

SGU Slow Green Recording Layer Sub-Unit

IL4 Fourth Interlayer

SRU Slow Red Recording Layer Sub-Unit

S Support

AHU Antihalation Layer Unit

SOC Surface Overcoat

Except for the division of the green recording layer unit into fast and slow sub-units FGU and SGU and the red recording layer unit into fast and slow sub-units FRU and SRU, the constructions and construction alternatives are essentially similar to those previously described from element SCN-1. The placement of AHU relative to S and the sensitized layers can vary depending on the decolorizing characteristics of the density forming components incorporated in AHU and on the intended use of the element, all as known in the art. Elements employing multiple AHU layers positioned on both faces of S are specifically contemplated.

Element SCN-3

SOC Surface Overcoat

FBU Fast Blue Recording Layer Unit

IL1 First Interlayer

FGU Fast Green Recording Layer Sub-Unit

IL2 Second Interlayer

FRU Fast Red Recording Layer Sub-Unit

IL3 Third Interlayer

MBU Mid Blue Recording Layer Unit

IL4 Fourth Interlayer

MGU Mid Green Recording Layer Sub-Unit

IL5 Fifth Interlayer

MRU Mid Red Recording Layer Sub-Unit

IL6 Sixth Interlayer

SBU Slow Blue Recording Layer Sub-Unit

IL7 Seventh Interlayer

SGU Slow Green Recording Layer Sub-Unit

IL8 Eighth Interlayer

SRU Slow Red Recording Layer Sub-Unit

AHU Antihalation Layer Unit

S Support

SOC Surface Overcoat

Except for the division of the blue, green, and recording layer units into fast, mid, and slow sub-units, the constructions and construction alternatives are essentially similar to those previously described from element SCN-1.

The following layer order arrangement is also especially useful:

Element SCN-4

SOC Surface Overcoat

FBU Fast Blue Recording Layer Unit

MBU Mid Blue Recording Layer Unit

SBU Slow Blue Recording Layer Sub-Unit

IL1 First Interlayer

FGU Fast Green Recording Layer Sub-Unit

MGU Mid Green Recording Layer Sub-Unit

SGU Slow Green Recording Layer Sub-Unit

IL2 Second Interlayer

FRU Fast Red Recording Layer Sub-Unit

MRU Mid Red Recording Layer Sub-Unit

SRU Slow Red Recording Layer Sub-Unit

IL3 Third Interlayer

AHU Antihalation Layer Unit

S Support

SOC Surface Overcoat

Except for the division of the blue, green, and recording layer units into fast, mid, and slow sub-units, the constructions and construction alternatives are essentially similar to those previously described from element SCN-1.

When the emulsion layers within a dye image-forming layer unit differ in speed, it is conventional practice to limit the incorporation of dye image-forming agent in the layer of highest speed to less than a stoichiometric amount, based on silver. The function of the highest speed emulsion layer is to create the portion of the characteristic curve just above the minimum density, i.e., in an exposure region that is below the threshold sensitivity of the remaining emulsion layer or layers in the layer unit. In this way, adding the increased granularity of the highest sensitivity speed emulsion layer to the dye image record produced is minimized without sacrificing imaging speed. Other details of film and camera characteristics that are especially useful in the present invention are described by Nozawa at U.S. Pat. No. 5,422,231 and by Sowinski et al at U.S. Pat. No. 5,466,560.

In the foregoing discussion the blue, green, and red recording layer units are described as containing yellow, magenta, and cyan image dye-forming agents, respectively, as is conventional practice in color negative elements used for printing. In the color negative elements of the invention, which are intended for scanning to produce three separate electronic color records, the actual hue of the image dye produced is of no importance. What is essential is merely that the dye image produced in each of the layer units be differentiable from that produced by each of the remaining layer units. To provide this capability of differentiation, it is contemplated that each of the layer units contains one or more dye image-forming agents chosen to produce image dye having an absorption half-peak bandwidth lying in a different spectral region. It is immaterial whether the blue, green, or red recording layer unit forms a yellow, magenta, or cyan dye having an absorption half peak bandwidth in the blue, green, or red region of the spectrum, as is conventional in a color negative element intended for use in printing, or an absorption half peak bandwidth in any other convenient region of the spectrum, ranging from the near ultraviolet (300–400 nm) through the visible and through the near infrared (700–1200 nm), so long as the absorption half peak bandwidths of the image dye in the layer units extend non-coextensive wavelength ranges. Preferably each image dye exhibits an absorption half-peak bandwidth that extends over at least a 25 (most preferably 50) nm spectral region that is not occupied by an absorption half-peak bandwidth of another image dye. Ideally the image dyes exhibit absorption half-peak bandwidths that are mutually exclusive.

In the special case where three radiant energy sources are used to sequentially irradiate the three color records of the film element, it must be appreciated that color forming chemistry to differentiate each color record is largely unnecessary. Instead, it is the sequential addition of neutral silver image density or single color dye image density that allows for information to be scanned from the individual color records. Other spatial methods are also useful for extraction of images of this type. For instance, the methods outlined in co-filed U.S. application Ser. No. 09/671,756 of Szajewski and Irving filed simultaneously herewith and herein incorporated by reference are particularly useful.

When a layer unit contains two or more emulsion layers differing in speed, it is possible to lower image granularity in the image to be viewed, recreated from an electronic record, by forming in each emulsion layer of the layer unit a dye image which exhibits an absorption half peak bandwidth that lies in a different spectral region than the dye images of the other emulsion layers of the layer unit. This technique is particularly well suited to elements in which the layer units are divided into sub-units that differ in speed. This allows multiple electronic records to be created for each layer unit, corresponding to the differing dye images formed by the emulsion layers of the same spectral sensitivity. The digital record formed by scanning the dye image formed by an emulsion layer of the highest speed is used to recreate the portion of the dye image to be viewed lying just above minimum density. At higher exposure levels second and, optionally, third electronic records can be formed by scanning spectrally differentiated dye images formed by the remaining emulsion layer or layers. These digital records contain less noise (lower granularity) and can be used in recreating the image to be viewed over exposure ranges above the threshold exposure level of the slower emulsion layers. This technique for lowering granularity is disclosed in greater detail by Sutton U.S. Pat. Nos. 5,314,794 and 5,389,506.

Each layer unit of the color negative elements of the invention produces a dye image characteristic curve gamma of less than 1.5, which facilitates obtaining an exposure latitude of at least 2.7 log E. A minimum acceptable exposure latitude of a multicolor photographic element is that which allows accurately recording the most extreme whites (e.g., a bride's wedding gown) and the most extreme blacks (e.g., a bridegroom's tuxedo) that are likely to arise in photographic use. An exposure latitude of 2.6 log E can just accommodate the typical bride and groom wedding scene. Accordingly, the elements useful in the practice of this invention exhibit an exposure latitude of at least 2.7 log E. An exposure latitude of at least 3.0 log E is preferred, since this allows for a comfortable margin of error in exposure level selection by a photographer. Even larger exposure latitudes of 3.6 log E are especially preferred for elements preloaded in one-time-use cameras, since the ability to obtain accurate image reproduction with rudimentary exposure control is realized. Whereas in color negative elements intended for printing, the visual attractiveness of the printed scene is often lost when gamma is exceptionally low, when color negative elements are scanned to create electronic image-bearing signals from the dye image records, contrast can be increased by adjustment of the electronic signal information. When the elements of the invention are scanned using a reflected beam, the beam travels through the layer units twice. This effectively doubles gamma ($\Delta D/\Delta \log E$) by doubling changes in density $\Delta D$). Thus, gammas as low as 0.5 or even 0.2 or lower are contemplated and exposure latitudes of up to about 5.0 log E or higher are feasible.

It is appreciated that while the element has been described in detail as a color negative element, similar considerations apply to positive working elements so long as they fulfill the latitude, gamma, masking a color forming agent, and gamma ratio requirements already described. In a concrete example, the element can be made positive working by employing direct reversal emulsions as known in the art. It is further appreciated that known color reversal elements fail the latitude, gamma, and gamma ratio requirements set out herein since these requirements are physically incompatible with the image gammas required for direct viewing and with the concomitant latitudes available from dye images.

A suitable thermal film renders an image in response to an imagewise exposure to light upon thermal development. Typical thermal processing conditions involve development temperatures of about 50 to 180° C. for a period of 0.1 to 60 seconds. The film base may be any suitable kind of film base that does not substantially decompose under the processing conditions. Polyethyleneterephthalate (PET), polyethylenenapthalate (PEN), and annealed PEN (APEN) are examples of suitable materials for the film base The accumulator for the film in the apparatus of the invention may be any suitable kind of device. Generally, it is preferred that the drive means for the accumulator also drives the cartridge to advance the film from the cartridge and rewind it into the cartridge. However, separate drive means to advance the film in and out of the cartridge and to drive the accumulator may also be provided. For compact design, it has been found that having the drive motor within the accumulator itself provides efficiency and compactness. While this is a preferred embodiment, it is not necessary to adequate function of the apparatus, and the drive motor or drive motors may be placed in any position suitable for actuating the thrust cartridge and accumulator to effect transport of the film. The drive motor may be any suitable type of drive motor. Drive motors include AC, DC, and stepper electric motors. Preferred for. the apparatus of the invention is a DC electric motor, as this provides a simple means of controlling drive speed. While DC electric motors are preferred in some embodiments, other types of motors or combinations of motors may be used to effect suitable means of driving the film.

The apparatus is provided with means for controlling the speed of the film over the heater. It is also provided with means for determining and controlling the output of the radiant heat source. It is important for the best photographic performance that the output of the radiant heat source be accurately controlled for optimum development temperature. The drive speed, in combination with the radiant heat source output, provides accurate control of the development process. The apparatus will be provided with a sensor to determine the instantaneous radiant output of the radiant heat source. The sensor may be a temperature sensing device such as a thermocouple or a photodetective means of determining the extent of thermal development of the thermal film or any other suitable device. A temperature sensing device such as a thermocouple may be mounted to contact the side of the film opposite of the radiant heat source or it may be mounted in any other suitable position within the device to provide an accurate means of monitoring the film development temperature. A photodetective means for monitoring the extent of development may provide a photodetector to monitor the increase in optical density of the thermal film with increasing development. A photoactive element incorporated into the thermal film that produces an IR absorbing dye in response to exposure to IR radiation at the wavelengths output by the radiant energy source and a photodetector to monitor the amount of IR dye produced and thereby monitor the extent of development of the thermal film is specifically contemplated. Forming an IR dye to monitor the extent of development has the advantage that the IR dye will not affect the visual appearance of the developed thermal film. The photodetector may be any suitable type of device capable of faithfully producing an electronic signal in response to incident light. Solid-state detectors and photomultiplier tubes are examples of suitable photosensitive elements. Preferred for the apparatus of the invention are solid state detectors. Charge coupled devices (CCD) or complementary metal oxide semiconductors (CMOS) are particular examples of suitable solid-state photoelectronic detectors. The detectors may be combined in a linear array so that stripes of the film corresponding to the length of the linear array are scanned simultaneously.

Power is supplied to the radiant heat source in proportion to a heat output deficiency detected by the thermocouple, photodetector, or other suitable sensor. The radiant power control circuit uses feedback to maintain and control the output of the radiant energy source and thereby control the development temperature. The speed of the film over the heater may be controlled by any suitable means of speed control. Pulse width modulation applied to a DC motor that drives both the thrust cartridge and accumulator or timed steps applied to a stepper motor that drives both the thrust cartridge and accumulator are examples of suitable speed control. The motor that drives both the thrust cartridge and the accumulator may be placed within the accumulator for compactness. While this is a preferred embodiment, the drive means may comprise one motor or any combination of motors located in suitable positions within the apparatus of the invention. The film speed is controlled to provide sufficient residence time for the film near the heater and to provide optimal development. The apparatus of the invention typically requires an exposure to the radiant heat source for about 2 to 30 seconds to develop a frame of film.

It may be desirable to provide a means to prevent exposure of the film to the radiant heat source at certain times. For instance, if the device is stopped while film is exposed to the radiant heat source, the film could be damaged or improperly developed. To prevent this, the radiant heat source can be turned off or a shield may be placed between the film and the radiant heat source.

The circuit actuating the radiant heat source may be controlled by preset conditions, or it may be constructed to respond to signals provided by sensors monitoring the film and/or development. Sensors may be mounted in the film path to monitor a plurality of parameters including film speed, film location, temperature, frame advancement, and fault conditions such as film breakage, film jam, and heater malfunction. Light emitting diode (LED) sensors are preferred for detection of the position of the image frames in the thermal film. While LED sensors are preferred for the detection of image frame position, the sensors utilized in the apparatus of the invention may be of any suitable type to monitor the parameters of interest. Sensors for the apparatus include optical, magnetic, mechanical, and electronic sensors. The response of such sensors is transmitted to the circuit actuating the radiant heat source to adjust the output of the radiant heat source as desired. In another embodiment, a shield is actuated to absorb or reflect the radiant energy before it reaches the thermal film as required to control development or protect the thermal film.

The optical writer may be any suitable type of optical writer. Optical writers that provide spatially resolved calibrated exposures are preferred as they provide a means to write information, graphics, and sensitometric tables. The light source for said optical writer may any suitable type of device. Fluorescent lamps, incandescent lamps, and light emitting diodes (LEDs) are examples of suitable types of light sources. Preferred for the apparatus of the invention are LEDs as LEDs comprise light sources that are efficient and compact. The light source may be a single unit or comprise many individual light emitting elements. A linear array of individually addressed light emitting diodes is an example of a suitable light source comprised of many individual light emitting elements. The light source may comprise elements capable of emitting light over particular spectral bands. Full color optical writing results from exposing film to a combination of light sources comprising three suitable spectral bands. Preferred for the apparatus of the invention are individually addressed tri-linear LED light sources as individually addressed tri-linear LED light sources comprise spatially resolved light emitting elements that may be constructed to emit light over particular spectral bands in an efficient and compact manner. While individually addressed tri-linear array light sources are a preferred embodiment, any suitable light source may be used for the optical writer. A preferred embodiment of the apparatus of the invention utilizes a tri-linear LED array as the light source for both optical writer and optical image scanner for compactness. The light source for said optical writer may be located anywhere in the film path on either the emulsion side of the film or the film base side of the film.

The apparatus of the invention may be provided with a means to control the light source for said optical writer. The apparatus of the invention may further be provided with a means to pulse the output of the light source for said optical writer to provide for exposure control. Exposure control may be effected by applying a known number of pulses of known duration to light emitting elements of the light source for said optical writer. The apparatus of the invention may also be provided with a means to spatially resolve optical writing by pulsing individual elements of the light source as the film travels between said thrust cartridge and said accumulator. A preferred embodiment of the invention comprises a three-color individually addressed tri-linear LED array light source that spans the film path to effect full color optical writing on either exposed or unexposed regions of said thermal film by pulsing individual LED elements as said thermal film passes between thrust cartridge and accumulator. Individually addressed tri-linear array light sources are available and are well known in the art. For example, tri-linear arrays comprising 5 red LED elements, 8 green LED elements, and 6 blue LED elements are commercially available at low cost. Control of individual elements may be provided as known in the art. The optical writer may write any sort of optical information. Typical sorts of optical information include alphanumerics such as text or time/date stamp, graphics, sensitometric tables and/or color patches or any other type of information that may be encoded optically on either previously exposed or unexposed regions of said thermal film.

The optical writer may be provided with controls to write optical information in different regions of the thermal film. For example, the optical writer may be controlled to write sensitometric tables between exposed but undeveloped region of the thermal film or the optical writer may be controlled to write a time/date stamp in a fixed location on a series of image frames. The apparatus of the invention may be used to write optical information on film that is not intended to be imagewise exposed to an external scene. The film contained in the thrust cartridge would then serve as a mass storage device for any type of information that may be encoded optically. Another embodiment for the apparatus of the invention provides a means to write optical information onto the film that is not readily apparent to the casual observer but that may be detected using appropriate instrumentation and/or analysis.

The optical detector for the optical writer may be any suitable type of device capable of faithfully detecting levels of incident radiation. Solid-state detectors such as charge coupled devices (CCDs) or complementary metal oxide semiconductor (CMOS) devices are preferred as they provide a means to faithfully record levels of incident radiation in a package that is compact and low in power requirements. A preferred embodiment of the apparatus of the invention comprises an optical detector for the optical writer that can detect incident radiation in particular spectral regions to provide for full color calibration of the light source for the optical writer or to determine the output of the radiant energy source. The apparatus of the invention may be provided with controls to control the output of the light source of the optical writer to provide a known exposure in response to incident radiation levels sensed by the optical detector of said optical writer. The apparatus of the invention may also be provided with a plurality of optical detective elements to simultaneously calibrate a light source that comprises spatially resolved individually addressed light emitting elements. A preferred embodiment of the invention utilizes a three color tri-linear CCD array as an optical detector for both the optical writer and the optical scanner for efficiency and compactness. The optical detector of the optical writer may be located anywhere in the film path and may be located on either the emulsion side or the film base side of the film.

The apparatus of the invention includes a means for optical scanning. The optical scanner provides an electronic representation of film image information or other information optically encoded on the film. The utility of such an electronic record is widely known in the art. For example, the electronic record of the film image information may be digitized and further processed using various algorithms and communicated to a printing device to yield high quality output prints without requiring optical printing. Typical application of the optical scanner involves scanning thermally processed regions of said thermal film. However, optical scanning may be performed either before or after thermal film has been entirely thermally processed. For example, a test patch of film may be thermally processed and optically scanned and the resulting optical density information may be used to modify subsequent processing conditions. If optical scanning is performed while regions of the film remain unprocessed, care must be taken to ensure that the light source of said scanner does not further expose unprocessed regions of the thermal film. After thermal processing and optical scanning, the film may be rewound back into the thrust cartridge for convenient storage.

The optical scanner may be any suitable type of optical scanner. Preferred for the apparatus of the invention are scanners that faithfully create an electronic record of the film image information. Typical of suitable optical scanners are optical scanners such as disclosed in U.S. Pat. No. 5,684,610—Brandestini et al. Optical transmission scanners are preferred as they provide high spatial resolution scanning with sufficient detection fidelity. The apparatus of the invention may be provided with a means to process, modify, store, and retrieve the electronic record. of the film image data produced by the optical scanner. A preferred embodiment of the system of the invention comprises using scanned data from sensitometric tables and/or color patches written onto the film by the optical writer to modify and control subsequent processing such as thermal development of undeveloped region of the film and optical scanning of other film image data to enhance imaging system performance. The system of the invention may further comprise means to process the electronic record of film image data in response to information provided by sensitometric tables and/or color patches written by the optical writer. The apparatus of the invention may also be provided with a means to process, store, and retrieve the electronic record of the optical scanning parameters associated with the optical scanning of the film. The apparatus of the invention may be provided with a means to communicate the electronic record of the film image data and/or scanning parameters to other hardware devices including displays, computer systems, and printers and to other electronic communication networks. Optical information may also be recorded on the thermally developable film to be read by the optical scanner and used to control thermal processing conditions or magnetic reading or magnetic writing.

The light source for the optical scanner may be any suitable type. Light sources include incandescent bulbs, fluorescent lamps, and light emitting diodes (LEDs). Preferred for the apparatus of the invention are LED light sources as LED light sources are efficient and compact. In one embodiment of the invention three distinct LED sources, each one emitting different wavelengths, are utilized as the light source. For example, blue, green, and red emitting LEDs may be combined to produce effectively white light to be used as the illuminant. While this is a particular embodiment, other suitable light sources may be used to effect faithful scanning of the film image information. The light source is provided with controls so that it may be activated and deactivated as appropriate to perform effective optical scanning without interfering with other functions of the invention.

A mirror or mirror system may be provided as part of the optical scanner to redirect the transmitted light. A preferred embodiment of the invention provides a mirror to direct the transmitted light beam to be roughly parallel to the film path for efficiency and compactness. Any suitable and appropriately reflective device may serve as a mirror. Silver coated polished aluminum mirrors are preferred for the apparatus of the invention as silver coated polished aluminum mirrors are robust, low-cost, and appropriately reflective. While silver coated polished aluminum mirrors represent a preferred embodiment, any suitably reflective surface may be used as a mirror in the apparatus of the invention. The mirror may be planar or curved. A non-planar mirror may be used to focus or otherwise modify the beam of transmitted light to improve scanner system performance.

The apparatus of the invention may be provided with a lens or lens system to modify the transmitted light beam. The lens or lens system may be comprised of spherical or non spherical lenses. Spectral filters may be provided in the light path to modify the spectral distribution of the incident or transmitted light beam. One embodiment of the invention incorporates liquid-crystal light modulators and/or spectral filters that may be electronically activated and/or mechanically actuated to modify and control the intensity and spectral distribution of the incident and transmitted light. An advantage of this embodiment is that it does not require a color sensitive photoelectronic detector. While this represents one embodiment, the apparatus of the invention does not require liquid-crystal light modulators or mechanically actuated spectral filters. To enhance fidelity and increase efficiency, all optical interfaces may be anti-reflection coated as is known in the art.

The photosensitive detector may be any suitable type of device capable of faithfully producing an electronic signal in response to incident light. Solid-stale detectors and photomultiplier tubes are examples of suitable photosensitive elements. Preferred for the apparatus of the invention are solid state detectors. Charge coupled devices (CCD) or complementary metal oxide semiconductors (CMOS) are particular examples of suitable solid-state photoelectronic detectors. The detectors may be combined in a linear array so that stripes of the film corresponding to the length of the linear array are scanned simultaneously. One embodiment of the invention utilizes a tri-linear array of photosensitive cells where each linear array is sensitive to incident radiation of a different spectral distribution. For example if a white light source is used, the transmitted light intensity data from red, green, and blue sensitive linear photodetector arrays can be processed to yield a full color electronic file representation of the film image information. While tri-linear array detectors are preferred, other suitable types of detectors may be used. For example, two-dimensional array detectors may be utilized to simultaneously scan larger areas of the film than tri-linear arrays. This would allow faster film feed rates and provide for more rapid scanning. Large two-dimensional array detectors may be used to simultaneously scan an entire film image frame.

The apparatus may be provided with controls for the optical scanner. The capability to perform optical scanning in response to information stored electronically, magnetically, or optically on the thermally developable film or the thrust cartridge or information provided by some other source is important to achieve optimal optical scanning. Parameters such as desired resolution, film type, and expected optical density range may be communicated to the optical scanner so that the scanning parameters may be altered to produce advantaged optical scans and prevent interference between optical scanning and other functions of the invention such as thermal processing or magnetic information reading or writing.

The magnetic reader may be any suitable type of magnetic reader. Preferred for the apparatus of the invention are inductive type laminated mu-metal core with a coil magnetic readers as such magnetic readers provide a low-cost and robust means to read magnetic information stored on film while minimizing noise and controlling crosstalk. The magnetic reader may be located anywhere in the film path. Locating the magnetic reader so that the magnetic information is read before the film is thermally processed is preferred as this allows the processing conditions to be controlled in response to the magnetic information and avoids potential degradation of the magnetic information associated with the thermal processing. Multiple magnetic readers may be included so that magnetic information is read at a variety of locations in the film path. The apparatus of the invention also contains means to store, transmit, and record electronic information. Specifically the apparatus of the invention contains means to store, transmit, and process the electronic record of the magnetic information sensed by the magnetic reader. This electronic record may be used to control or modify subsequent processes such as thermal processing, optical printing, or optical scanning. The capability to perform subsequent processing in response to information stored magnetically on the film is important to optimal imaging system performance. For example, since different thermal film formulations generally require different thermal processing conditions to achieve optimal development, controlling the output of the radiant heat source and film drive speed in response to film type information that may be stored magnetically on the film is important to achieve optimal development and subsequent image quality.

The magnetic writer may be any suitable type of magnetic writer. Preferred for the apparatus of the invention are inductive type laminated mu-metal core with a coil magnetic writers as such magnetic writers provide a low-cost and robust means to write magnetic information onto film. The magnetic writer may be located anywhere in the film path. Locating the magnetic writer so that the magnetic information is written after the film is thermally processed is preferred as this avoids potential degradation of the magnetic information associated with the thermal processing. Multiple magnetic writers may be included so that magnetic information is written at a variety of locations in the film path. The magnetic writer can write any type of information that may be encoded magnetically. Specifically the magnetic writer may rewrite data previously stored on the film or film cartridge or the magnetic writer may write new information onto the film such as the processing conditions or the date of processing. Such information is used to optimize subsequent processing. For example, advantaged optical scanning results from adjusting optical scanning parameters to provide for expected density values based on the processing conditions.

The magnetic writer may be combined with the magnetic reader into a single assembly or they may be separate. A preferred embodiment of the apparatus of the invention requires magnetic information to be written onto the film in positions that are known relative to other elements on the film such as imaging frames. A preferred means of determining the image frame position comprises light emitting diode (LED) sensors and perforations in the film spaced at regular intervals relative to the imaging frames. Writing the magnetic information onto regions of the film in registry with the imaging frames allows frame specific information to be more accurately and immediately applied to individual frames resulting in improved system efficiency.

The apparatus of the invention may be provided with a means to erase any magnetic information stored on the film.

The device used to erase the magnetic information may be any suitable type of device. The magnetic eraser may be located anywhere in the film path. Locating the magnetic eraser so that the magnetic information is erased after the film is thermally processed but before magnetic information is rewritten onto the film is preferred, as this allows potentially degraded magnetic information to be discarded and further allows for more effective writing of magnetic information by the magnetic writer. The magnetic eraser may also allow the magnetic writer to write magnetic information in a more efficient or useful format than originally present on the film.

The apparatus of the invention may be provided with a means to preserve the magnetic information through the thermal processing conditions. The magnetic information may be preserved through the thermal processing conditions by insulating regions of the film containing the magnetic information from the temperature extremes of the thermal process. This may be accomplished by providing power to the heater only when the regions of the film containing magnetic information are in positions so as not to be overly subject to the temperature extremes of thermal development.

The leader for the thermal film should maintain its dimensional stability during processing of the film. The film will misfeed or jam in the film path if the leader exhibits excessive curl, warp, or twist, or expands or contracts excessively under the conditions of the thermal processing. The leader is critical to the repeated use of the developed film in the thrust cartridge. A degraded or unsuitable leader prevents the film from smoothly traversing the film path and results in excessive wear of the film including scratching of the image elements. Repeated use of a thrust cartridge containing film with an unsuitable leader will also cause the thrust cartridge to fail so that the film can no longer be thrust from or rewound into the thrust cartridge. To avoid these problems, the leader may either be protected from the heat extremes of development or be formed of a material that is dimensionally stable at the temperatures of development of up to 180° C. The leader is protected from the heat extremes of development by shielding the thermal film from the radiant energy source or providing power to the radiant energy source only after the leader has passed and is no longer in close proximity to the heater. The shield is then removed or power is then provided to the radiant energy as necessary to process the imaging frames. Suitable actuation of the shield may be provided by a variety of electromotive sub assemblies. Insulating the leader from the heating element is not required if the leader is comprised of a material that maintains sufficient dimensional stability through the process conditions. To prevent unwanted distortion of the image, the film base need also remain stable through the processing conditions. The typical developing temperatures for color thermal film are likely to be between 50 and 180° C. Therefore, any suitable material that maintains sufficient dimensional stability through these process conditions could be used as the leader or film base material. Polyethyleneterephthalate (PET) is found to be sufficiently stable to be used as a leader and film base, provided the exposure to the highest temperature processing conditions is not excessive.

The device may be of any size that is adequate to house the cartridge, heater, and drive mechanisms. It is preferred that the invention apparatus be made as compact as possible. It is considered desirable that the apparatus be of such a size that it may be fit into a drive bay of a computer. Typically, the lighttight container of the apparatus of the invention would have a volume of less than 1200 $cm^3$.

The power for the apparatus of the invention may be any suitable source. It may be provided with a means to be plugged into a standard electrical outlet. If the device is installed in a computer or as a computer peripheral device, it could draw power from the computer. The apparatus of the invention does not require many of the resources necessary to traditional wet-process photofinishing. It, therefore, allows more convenient photofinishing than traditional wet-processes. It is contemplated that the apparatus of the invention will find application in more widely dispersed settings, such as home or small office use, than traditional wet-process photofinishing. It is further contemplated that the device of the invention will allow photofinishing in remote locations lacking resources, such as contaminant free water and means to treat contaminated effluent, necessary for traditional wet processing. A battery could be utilized as the power source in a remote location for rapid and convenient processing of exposed film.

The following examples illustrate the practice of this invention. They are not intended to be exhaustive of all possible variations of the invention. Parts and percentages are by weight unless otherwise indicated.

EXAMPLES

Example 1

A full color heat developable film is prepared. Light-Sensitive Silver Halide Emulsion (1) [for Red Sensitive Emulsion Layer].

Solution (1) and solution (2) shown in Table 1 are concurrently added to a well-stirred aqueous solution of gelatin (a solution of 16 g of gelatin, 0.24 g of potassium bromide, 1.6 g of sodium chloride, and 24 mg of compound (a) in 540 ml of water heated at 55° C.) at the same flow rate for 19 minutes. After 5 minutes, solution (3) and solution (4) shown in Table 1 are further concurrently added thereto at the same flow rate for 24 minutes. After washing and salt removal by a conventional method, 17.6 g of lime-treated ossein gelatin and 56 mg of compound (b) are added to adjust the pH and the pAg to 6.2 and 7.7, respectively. Then, 1.02 mg of trimethylthiourea are added, followed by optimum chemical sensitization at 60° C. Thereafter, 0.18 g of 4-hydroxy-6-methyl-1,3,3a,7-tetraazainedene, 64 mg of sensitizing dye (C) and 0.41 g of potassium bromide are in turn added, followed by cooling. Thus, 590 g of a monodisperse cubic silver chlorobromide emulsion having a mean grain size of 0.30 μm is obtained.

TABLE 1

| | Solution (1) | Solution (2) | Solution (3) | Solution (4) |
|---|---|---|---|---|
| $AgNO_3$ | 24.0 g | — | 56.0 g | — |
| $NH_4NO_3$ | 50.0 mg | — | 50.0 mg | — |
| KBr | — | 10.9 g | — | 35.3 g |
| NaCl | — | 2.88 g | — | 1.92 g |
| $K_2IrCl_6$ | — | 0.07 mg | — | — |
| Amount Completed | Water to make 130 ml | Water to make 200 ml | Water to make 130 ml | Water to make 200 ml |

Compound (a)

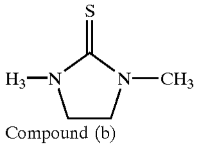

Compound (b)

TABLE 1-continued

| | Solution (1) | Solution (2) | Solution (3) | Solution (4) |
|---|---|---|---|---|

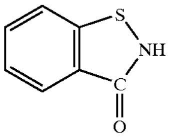

Dye (C)

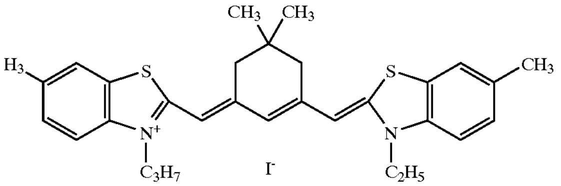

Light-Sensitive Silver Halide Emulsion (2) [for Green Sensitive Emulsion Layer].

Solution (1) and solution (2) shown in Table 2 are concurrently added to a well-stirred aqueous solution of 5% gelatin (a solution of 20 g of gelatin, 0.30 g of potassium bromide, 2.0 g of sodium chloride, and 30 mg of compound (a) in 600 ml of water heated at 46° C.) at the same flow rate for 10 minutes. After 5 minutes, solution (3) and solution(4) shown in Table 2 are further concurrently added thereto at the same flow rate for 30 minutes. One minute after termination of addition of solutions (3) and (4), 600 ml of a solution of sensitizing dyes in methanol containing 360 mg of sensitizing dye ($d_1$) and 73.4 mg of sensitizing dye ($d_2$) is added. After washing and salt removal (conducted using sedimenting agent (e) at pH 4.0) by a conventional method, 22 g of lime-treated ossein gelatin is added to adjust the pH and pAg to 6.0 and 7.6, respectively. Then 1.8 mg of sodium thiosulfate and 180 mg of 4-hydroxy-6-methyl-1,3,3a,7-tetraazainedene are added, followed by optimum chemical sensitization at 60° C. Thereafter, 90 mg of antifoggant (f) and 70 mg of compound (b) and 3 ml of compound (g) as preservatives are added, followed by cooling. Thus, 635 g of a monodisperse cubic silver chlorobromide emulsion having a mean grain size of 0.30 μm is obtained.

TABLE 2

| | Solution (1) | Solution (2) | Solution (3) | Solution (4) |
|---|---|---|---|---|
| $AgNO_3$ | 10.0 g | — | 90.0 g | — |
| $NH_4NO_3$ | 60.0 mg | — | 380 mg | — |
| KBr | — | 3.50 g | — | 57.1 g |
| NaCl | — | 1.72 g | — | 3.13 g |
| $K_2IrCl_6$ | — | — | — | 0.03 mg |
| Amount Completed | Water to make 26 ml | Water to make 131 ml | Water to make 280 ml | Water to make 289 ml |

Dye ($d_1$)

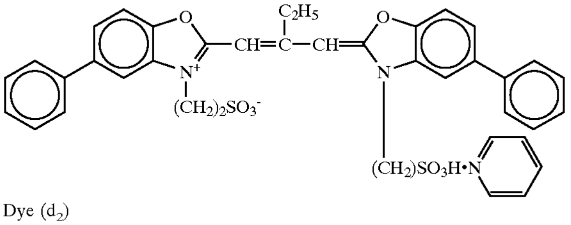

Dye ($d_2$)

TABLE 2-continued

| | Solution (1) | Solution (2) | Solution (3) | Solution (4) |
|---|---|---|---|---|

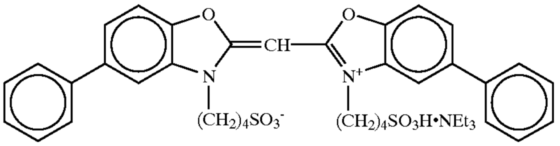

Sedimenting agent (e)

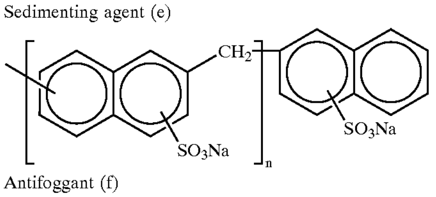

Antifoggant (f)

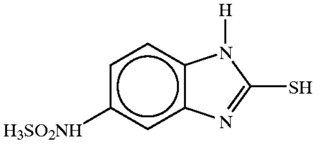

Compound (g)

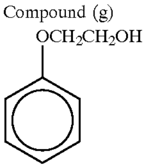

Light-Sensitive Silver Halide Emulsion (3) [for Blue Sensitive Emulsion Layer].

First, addition of solution (2) shown in Table 3 to a well-stirred aqueous solution of 5% gelatin (a solution of 31.6 g of gelatin, 2.5 g of potassium bromide, and 13 mg of compound (a) in 584 ml of water heated at 70° C.) is started. After 10 minutes addition of solution (1) is started. Solutions (1) and (2) are thereafter added for 30 minutes. Five minutes after termination of addition of solution (2), addition of solution (4) shown in Table 3 is further started, and after 10 seconds, addition of solution (3) is started. Solution (3) was added for 27 minutes and 50 seconds, and solution (4) is added for 28 minutes. After washing and salt removal (conducted using sedimenting agent (e') at pH 3.9) by a conventional method, 24.6 g of lime treated ossein gelatin and 56 mg of compound (b) are added to adjust the pH and the pAg to 6.1 and 8.5, respectively. Then 0.55 mg of sodium thiosulfate is added, followed by optimum chemical sensitization at 65° C. Thereafter, 0.35 g of sensitizing dye (h), 56 mg of antifoggant (i), and 2.3 ml of compound (g) as a preservative are added, followed by cooling. Thus, 582 g of a monodisperse octahedral silver bromide emulsion having a mean grain size of 0.55 μm is obtained.

TABLE 3

| | Solution (1) | Solution (2) | Solution (3) | Solution (4) |
|---|---|---|---|---|
| $AgNO_3$ | 15.8 g | — | 72.2 g | — |
| $NH_4NO_3$ | 68.0 mg | — | 308 mg | |
| KBr | — | 11.4 g | — | 52.2 g |
| Amount Completed | Water to make 34 ml | Water to make 134 ml | Water to make 194 ml | Water to make 195 ml |

Sedimenting Agent (e')

TABLE 3-continued

| | Solution (1) | Solution (2) | Solution (3) | Solution (4) |
|---|---|---|---|---|

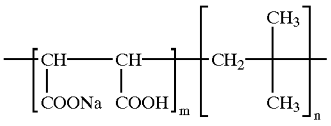

m + n = 1

Dye (h)

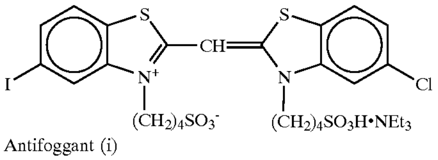

Antifoggant (i)

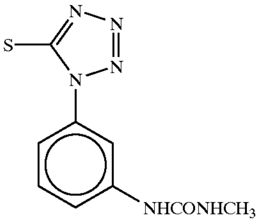

Benzotriazole Silver Emulsion (Organic Silver Salt)

In 300 ml of water, 28 g of gelatin and 13.2 g of benzotriazole are dissolved. The resulting solution was maintained at 40° C. and stirred. A solution of 17 g of silver nitrate in 100 ml of water is added to this solution for 2 minutes. The pH of the resulting benzotriazole silver emulsion is adjusted to remove excess salts by sedimentation. Then the pH is adjusted to 6.30 to obtain 400 g of a benzotraizole silver emulsion.

Method for Preparing Emulsified Dispersions of Couplers.

The oil phase ingredients and aqueous phase ingredients shown in Table 4 are each dissolved to form homogeneous solutions having a temperature of 60° C. Both the solutions are combined and dispersed in a 1-liter stainless steel vessel with a dissolver equipped with a 5 cm diameter disperser at 10,000 rpm for 20 minutes. Then hot water is added in amounts shown in Table 4 as post water addition, followed by mixing at 2,000 rpm for 10 minutes. Thus, emulsified dispersions of three colors of cyan, magenta, and yellow are prepared.

TABLE 4

| | | Cyan | Magenta | Yellow |
|---|---|---|---|---|
| Oil Phase | Cyan Coupler (1) | 4.64 g | — | — |
| | Magenta Coupler (2) | — | 3.18 g | — |
| | Yellow Coupler (3) | — | — | 2.96 g |
| | Developing Agent (4) | 1.78 g | 1.78 g | 1.78 g |
| | Antifogant (5) | 0.08 g | 0.08 g | 0.08 g |
| | igh Boiling Solvent (6) | 4.08 g | 4.85 g | 3.83 g |
| | Ethyl Acetate | 24 ml | 24 ml | 24 ml |
| Aqueous Phase | Lime-Treated Gelatin | 5.0 g | 5.0 g | 5.0 g |
| | Surfactant (7) | 0.40 g | 0.40 g | 0.40 g |
| | Water | 75.0 ml | 75.0 ml | 75.0 ml |
| | Post Water Addition | 60.0 ml | 60.0 ml | 60.0 ml |

Cyan Coupler (1)

TABLE 4-continued

| | Cyan | Magenta | Yellow |
|---|---|---|---|

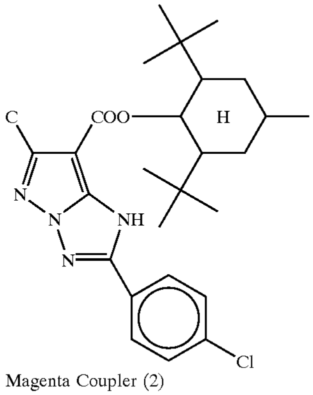

Magenta Coupler (2)

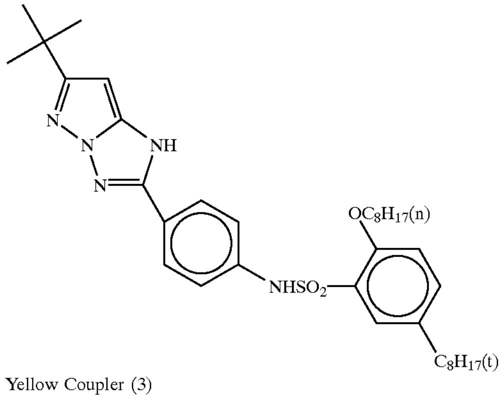

Yellow Coupler (3)

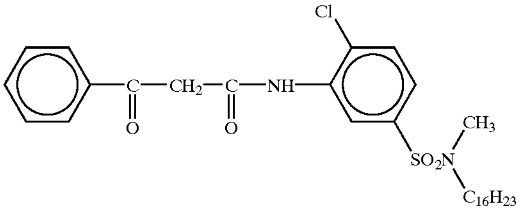

Developing Agent (4)

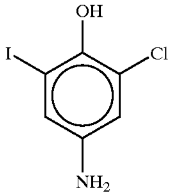

Antifoggant (5)

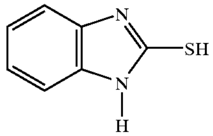

High Boiling Solvent (6)

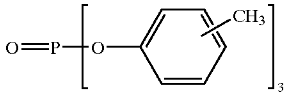

Surfactant (7)

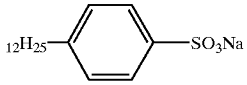

Using the material thus obtained, heat development color photographic material having the multilayer constitution shown in Table 5 is prepared. An organic IR absorbing dye is incorporated in the gelatin matrix of the heat developable thermal film as indicated in Table 5. Annealed polyethylenenapthalate (APEN) containing an effectively transparent coating of magnetic particles suitable for use as a magnetic recording medium is used as a film base. This film is loaded in a thrust cartridge, and the thrust cartridge is inserted into a camera and imagewise exposed to a full color test scene. The film is then rewound into the thrust cartridge, removed from the camera, and inserted into the chamber for accepting the thrust cartridge of the apparatus of the invention. The lighttight door of the apparatus of this invention is closed and the film drive mechanism is activated to thrust the film along the film path into the accumulator. The magnetic reader reads magnetic information stored on the film. The electronic record of this magnetic information is used to control and modify the thermal processing conditions and the electronic record of the magnetic information is stored in an electronic storage device. The optical writer is calibrated by an optical detector and is used to write a sensitometric table and color patches onto an unexposed region of the thermal film. The output of a laser diode radiant energy source is adjusted and set in accordance to the magnetic information stored on the film. The drive speed is adjusted to provide for a development time in accordance to the magnetic information stored on the film. The film is driven past the laser diode radiant heater to effect thermal development. The processed film is then driven past the magnetic writer which writes magnetic information onto the film. The film is then driven past the illuminated light source of the optical scanner. The light transmitted through the film is reflected by a mirror through a lens system onto a tri-linear CCD array photodetector. Parameters of the photodetector such as relative red green and blue exposure times are adjusted electronically to optimize scanning conditions in response to information stored magnetically on the film. The tri-linear photodetector array faithfully produces an electronic file representation of the sensitometric table written by the optical writer. The electronic file representation of the sensitometric table provided by the optical writer is processed and the data is used to control subsequent optical scanning of image frame information. The resulting image frame information electronic file is manipulated in referencet the data provided by the sensitometric table to correct color and tone scale and the corrected image frame electronic file is output to a digital printer. Inspection of the digital print reveals that the full color image scene is faithfully reproduced by this photothermographic system. The film is rewound into the thrust cartridge and removed from the apparatus of the invention.

TABLE 5

| Layer Constitution | Material Added | Amount Added (mg/m$^2$) |
|---|---|---|
| 6th Layer | Lime-Treated Gelatin | 1940 |
| Protective Layer | Matte Agent (Silica) | 200 |
| | Surfactant (8) | 50 |
| | Surfactant (9) | 300 |
| | Base Precursor (10) | 1400 |
| | Water-Soluble Polymer (11) | 120 |
| 5th Layer | Lime-Treated Gelatin | 2000 |
| Yellow Color | Blue-Sensitive Silver Halide Emulsion | 1250 (converted to silver) |
| Forming Layer | Benzotriazole Silver Emulsion | 300 (converted to silver) |
| | Yellow Coupler (3) | 600 |
| | Developing Agent (4) | 360 |
| | Antifoggant (5) | 16 |
| | High Boiling Solvent (6) | 774 |
| | Surfactant (7) | 80 |
| | Heat Solvent (12) | 1400 |
| | Surfactant (9) | 70 |
| | Water-Soluble Polymer (11) | 40 |
| 4th Layer | Lime-Treated Gelatin | 970 |
| Intermediate Layer | Surfactant (8) | 50 |
| | Surfactant (9) | 300 |
| | Base Precursor (10) | 1400 |
| | Water-Soluble Polymer (11) | 60 |
| | IR Absorber Dye (13) | 30 |
| 3rd Layer | Lime-Treated Gelatin | 1000 |
| Magenta Color | Green-Sensitive Silver Halide Emulsion | 625 (converted to silver) |
| Formation Layer | Benzotriazole Silver Emulsion | 150 (converted to silver) |
| | Magenta Coupler (2) | 320 |
| | Developing Agent (4) | 180 |
| | Antifoggant (5) | 8 |
| | High Boiling Solvent (6) | 490 |
| | Surfactant (7) | 40 |
| | Heat Solvent (12) | 700 |
| | Surfactant (9) | 35 |
| | Water-Soluble Polymer (11) | 20 |
| 2nd Layer | Lime-Treated Gelatin | 970 |
| Intermediate Layer | Surfactant (8) | 50 |
| | Surfactant (9) | 300 |
| | Base Precursor (10) | 1400 |
| | Water-Soluble Polymer (11) | 60 |
| | IR Absorber Dye (13) | 30 |
| 1st Layer | Lime-Treated Gelatin | 1000 |
| Cyan Color | Red-Sensitive Silver Halide Emulsion | 625 (converted to silver) |
| Formation Layer | Benzotriazole Silver Emulsion | 150 (converted to silver) |

TABLE 5-continued

| Layer Constitution | Material Added | Amount Added (mg/m$^2$) |
|---|---|---|
| | Cyan Coupler (1) | 470 |
| | Developing Agent (4) | 180 |
| | Antifoggant (5) | 8 |
| | High Boiling Solvent (6) | 410 |
| | Surfactant (7) | 40 |
| | Heat Solvent (12) | 700 |
| | Surfactant (9) | 35 |
| | Water-Soluble Polymer (11) | 20 |
| Transparent PET Base (102 μm) | | |

Surfactant (8)

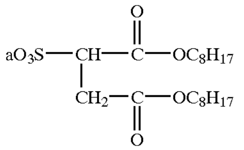

Surfactant (9)

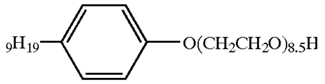

Base Precursor (10)

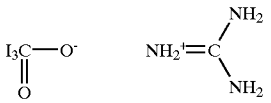

Water-Soluble Polymer (11)

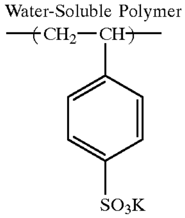

Heat Solvent (12)
D-Sorbitol
IR Absorber Dye (13)

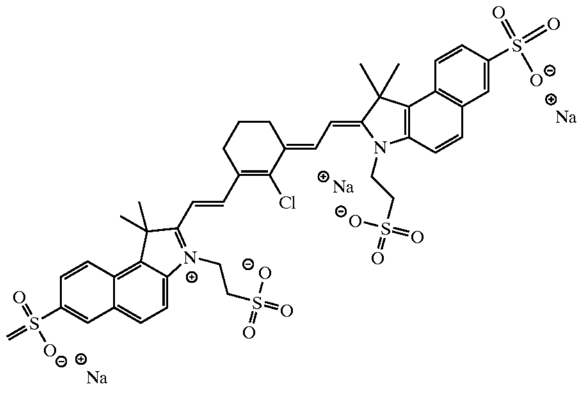

Example 2

This example is prepared by methods equivalent to Example 1 except that different IR absorbing dyes are added to each color record so that they can be individually addressed and heated sequentially. Thus, the multilayer constitution shown in Table 6 is prepared. Color forming couplers are (optionally) removed from the individual color records. Organic IR absorbing dyes are incorporated in the gelatin matrix of the heat developable thermal film as indicated in Table 6. Annealed polyethylenenapthalate (APEN) containing an effectively transparent coating of magnetic particles suitable for use as a magnetic recording medium is used as a film base. This film is loaded in a thrust cartridge, and the thrust cartridge is inserted into a camera and imagewise exposed to a full color test scene. The film is then rewound into the thrust cartridge, removed from the camera, and inserted into the chamber for accepting the thrust cartridge of the apparatus of the invention. The lighttight door of the apparatus of this invention is closed and the film drive mechanism is activated to thrust the film along the film path into the accumulator. The magnetic reader reads magnetic information stored on the film. The electronic record of this magnetic information is used to control and modify the thermal processing conditions, and the electronic record of the magnetic information is stored in an electronic storage device. The optical writer is calibrated by an optical detector and is used to write a sensitometric table and color patches onto an unexposed region of the thermal film. An optical system is utilized to allow radiant energy from three laser diode radiant energy sources to be sequentially directed to the film plane. The output of the first laser diode radiant energy source (780 nm) is adjusted and set in accordance to the magnetic information stored on the film. The drive speed is adjusted to provide for a development time in accordance to the magnetic information stored on the film. The film is driven past the first laser diode radiant heater to effect thermal development in the green sensitive layer. The film is then driven past the illuminated light source of the optical scanner. The light transmitted through the film is reflected by a mirror through a lens system onto a CCD array photodetector. Parameters of the photodetector are adjusted electronically to optimize scanning conditions in response to information stored magnetically on the film. The film is then rewound from the accumulator back into the thrust cartridge. The output of the second laser diode radiant energy source (950 nm) is adjusted and set in accordance to the magnetic information stored on the film. The drive speed is adjusted to provide for a development time in accordance to the magnetic information stored on the film. The film is driven past the second laser diode radiant heater to effect thermal development in the red sensitive layer. The film is then driven past the illuminated light source of the optical scanner. The light transmitted through the film is reflected by a mirror through a lens system onto a CCD array photodetector. Parameters of the photodetector are adjusted electronically to optimize scanning conditions in response to information stored magnetically on the film. The film is then rewound from the accumulator back into the thrust cartridge. The output of the third laser diode radiant energy source (880 nm) is adjusted and set in accordance to the magnetic information stored on the film. The drive speed is adjusted to provide for a development time in accordance to the magnetic information stored on the film. The film is driven past the third laser diode radiant heater to effect thermal development in the blue sensitive layer. The film is then driven past the illuminated light source of the optical scanner. The light transmitted through the film is reflected by a mirror through a lens system onto a CCD array photodetector. Parameters of the photodetector are adjusted electronically to optimize scanning conditions in response to information stored magnetically on the film.

The information from the first photodetector array scan is used to represent the image in the green sensitive layer. In like manner, the next two photodetector scans represent the image in the green+red sensitive layers and the green+red+blue sensitive layers respectively. Individual red and blue sensitive information is then calculated by differencing the information in the second and third respective scans with the previous scan.

The processed film is then driven past the magnetic writer which writes magnetic information onto the film. The photodetector array faithfully produces an electronic file representation of the sensitometric table written by the optical writer. The electronic file representation of the sensitometric table provided by the optical writer is processed and the data is used to control subsequent processing of image frame information. The resulting image frame information electronic file is manipulated in reference to the data provided by the sensitometric table to correct color and tone scale, and the corrected image frame electronic file is output to a digital printer. Inspection of the digital print reveals that the full color image scene is faithfully reproduced by this photothermographic system. The film is rewound into the thrust cartridge and removed from the apparatus of the invention.

TABLE 6

| Layer Constitution | Material Added | Amount Added ($mg/m^2$) |
|---|---|---|
| 6th Layer | Lime-Treated Gelatin | 1940 |
| Protective Layer | Matte Agent (Silica) | 200 |
| | Surfactant (8) | 50 |
| | Surfactant (9) | 300 |
| | Water-Soluble Polymer (11) | 120 |
| 5th Layer | Lime-Treated Gelatin | 2000 |
| Blue Light | Blue-Sensitive Silver Halde Emulsion | 1250 (converted to silver) |
| Sensitive Layer | Benzotriazole Silver Emulsion | 300 (converted to silver) |
| | Developing Agent (4) | 360 |
| | Antifoggant (5) | 16 |
| | High Boiling Solvent (6) | 774 |
| | Surfactant (7) | 80 |
| | Heat Solvent (12) | 1400 |
| | Base Precursor (10) | 1400 |
| | IR Absorber Dye (14) | 30 |
| | Surfactant (9) | 70 |
| | Water-Soluble Polymer (11) | 40 |
| 4th Layer | Lime-Treated Gelatin | 970 |
| Intermediate Layer | Surfactant (8) | 50 |
| | Surfactant (9) | 300 |
| | Water-Soluble Polymer (11) | 60 |
| 3rd Layer | Lime-Treated Gelatin | 1000 |
| Green Light | Green-Sensitive Silver Halide Emulsion | 625 (converted to silver) |
| Sensitive Layer | Benzotriazole Silver Emulsion | 150 (converted to silver) |
| | Developing Agent (4) | 180 |
| | Antifoggant (5) | 8 |
| | High Boiling Solvent (6) | 490 |
| | Surfactant (7) | 40 |
| | Heat Solvent (12) | 700 |
| | Base Precursor (10) | 1400 |
| | IR Absorber Dye (15) | 15 |

TABLE 6-continued

| Layer Constitution | Material Added | Amount Added (mg/m$^2$) |
|---|---|---|
| | IR Absorber Dye (16) | 15 |
| | Surfactant (9) | 35 |
| | Water-Soluble Polymer (11) | 20 |
| 2nd Layer | Lime-Treated Gelatin | 970 |
| Intermediate Layer | Surfactant (8) | 50 |
| | Surfactant (9) | 300 |
| | Water-Soluble Polymer (11) | 60 |
| 1st Layer | Lime-Treated Gelatin | 1000 |
| Red Light | Red-Sensitive Silver Halide Emulsion | 625 (converted to silver) |
| Sensitive Layer | Benzotriazole Silver Emulsion | 150 (converted to silver) |
| | Developing Agent (4) | 180 |
| | Antifoggant (5) | 8 |
| | High Boiling Solvent (6) | 410 |
| | Surfactant (7) | 40 |
| | Heat Solvent (12) | 700 |
| | Base Precursor (10) | 1400 |
| | IR Absorber Dye (17) | 30 |
| | Surfactant (9) | 35 |
| | Water-Soluble Polymer (11) | 20 |
| Transparent PET Base (102 μm) | | |

IR Absorber Dye (14)

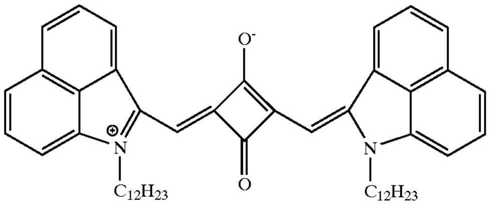

IR Absorber Dye (15)

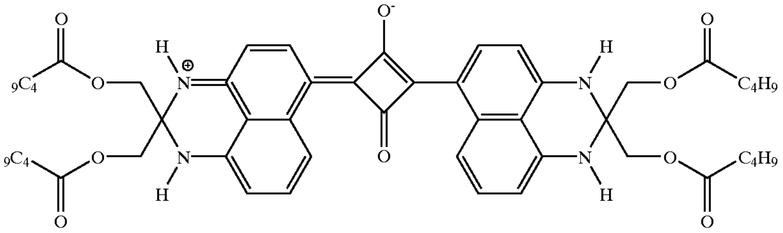

IR Absorber Dye (16)

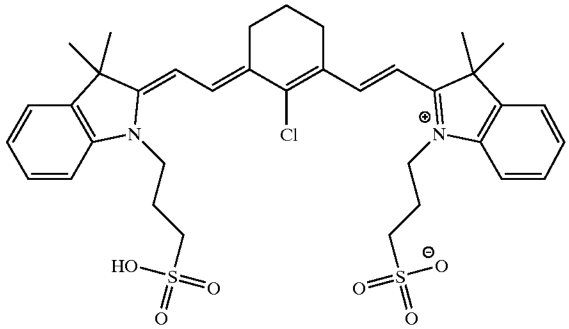

IR Absorber dye (17)

TABLE 6-continued

| Layer Constitution | Material Added | Amount Added ($mg/m^2$) |
|---|---|---|

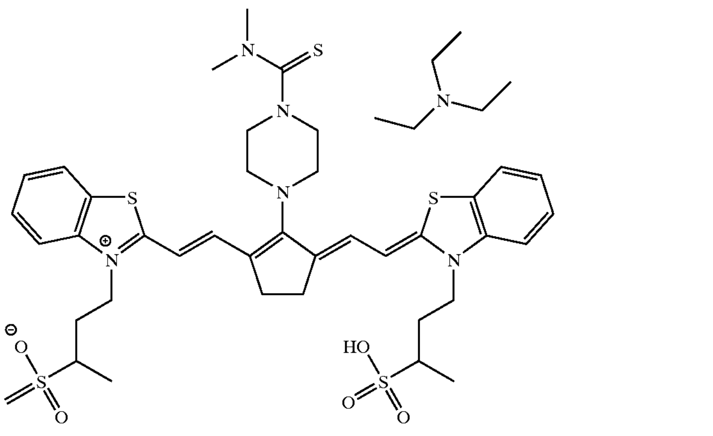

The invention has been described in detail with particular reference to certain preferred embodiments thereof, but it will be understood that variations and modifications can be effected within the spirit and scope of the invention.

What is claimed is:

1. An apparatus for radiant thermal development of photothermal film comprising a receiving chamber for a film cartridge, drive means to advance thermal film from said film cartridge and rewind film into said film cartridge, an accumulator to gather said film after it has left the cartridge, a source of radiant energy, a guiding means to guide said radiant energy to develop said thermal film as said thermal film passes between said cartridge and said accumulator, a radiant energy absorbing means incorporated into said photothermal film, and a lighttight container for said chamber, source of radiant energy, and accumulator.

2. The apparatus of claim 1 further comprising sensing means to determine the output of said radiant energy source.

3. The apparatus of claim 1 further comprising photodetector means to calibrate and control the extent of development of said photothermal film.

4. The apparatus of claim 1 further comprising means to regulate the output of said radiant energy source and the speed of said drive means.

5. The apparatus of claim 1 further comprising conductive or convective means to heat said photothermal film.

6. The apparatus of claim 1 further comprising means to direct the radiant energy to effect localized development of said photothermal film.

7. The apparatus of claim 1 wherein said radiant energy source comprises a diode laser.

8. The apparatus of claim 1 wherein said radiant energy absorbing material comprises an organic dye.

9. The apparatus of claim 1 wherein the output spectra of said radiant energy source is matched with the absorption spectra of said radiant energy absorbing material.

10. The apparatus of claim 1 wherein said apparatus further includes means for magnetic reading of said thermal film.

11. The apparatus of claim 1 wherein said apparatus further includes means for magnetic writing to said thermal film.

12. The apparatus of claim 1 further comprising means for preserving magnetic information on said thermal film during development.

13. The apparatus of claim 1 wherein said apparatus further comprises an image scanner means for forming an electronic record of the optical information stored on said thermal film.

14. The apparatus of claim 1 wherein said apparatus further comprises an optical writer means to write optical information onto undeveloped regions of thermal film.

15. The apparatus of claim 1 wherein said apparatus further comprises an information processor and digital storage device to process and store digitized electronic information.

16. The apparatus of claim 1 wherein radiant energy source does not substantially emit radiation between optical wavelengths of 400 to 700 nm.

17. The apparatus of claim 1 wherein said radiant energy absorbing material does not substantially absorb radiation between optical wavelengths of 400 to 700 nm.

18. The apparatus of claim 8 wherein the output spectra of said radiant energy source is matched with the absorption spectra of said radiant energy absorbing material.

19. The apparatus of claim 8 wherein said radiant energy absorbing material does not substantially absorb radiation between optical wavelengths of 400 to 700 nm.

20. The apparatus of claim 18 wherein said radiant energy absorbing material does not substantially absorb radiation between optical wavelengths of 400 to 700 nm.

21. The apparatus of claim 1 wherein said radiant energy absorbing material absorbs radiation having an optical wavelength greater than 700 nm.

22. The apparatus of claim 18 wherein said radiant energy absorbing material absorbs radiation having an optical wavelength greater than 700 nm.

23. A method of developing thermal film comprising placing a film cartridge containing exposed thermal film incorporating a radiant energy absorbing material into a receiving chamber, driving said thermal film from said chamber, taking up the film in an accumulating means, and developing said film by exposure to radiant energy as said film passes between the film cartridge and said accumulator.

24. The method of claim 23 wherein said photothermal film process conditions are maintained between 50 to 180° C.

25. The method of claim 23 wherein a photodetector means is used to monitor the extent of development of said photothermal film.

26. The method of claim 23 wherein said radiant energy source is regulated in response to a sensing device to determine the output of said radiant energy source or the extent of development of said photothermal film.

27. The method of claim 23 wherein said film drive mechanism is regulated in response to a sensing device to determine the output of said radiant energy source or the extent of development of said photothermal film.

28. The method of claim 23 wherein conductive or convective heating means are used to heat said thermal film in addition to said radiant heat source.

29. The method of claim 23 wherein radiant energy is directed to effect localized development of said thermal film.

30. The method of claim 23 wherein a diode laser provides radiant energy to develop said photothermal film.

31. The method of claim 23 wherein said radiant energy absorbing material comprises an organic dye incorporated into the film.

32. The method of claim 23 wherein radiant energy absorbing material is incorporated into said thermal film that have absorption spectra that match the emission spectra of said radiant energy source.

33. The method of claim 23 wherein radiant energy source does not substantially emit radiation between optical wavelengths of 400 to 700 nm.

34. The method of claim 23 wherein said radiant energy absorbing material does not substantially absorb radiation between optical wavelengths of 400 to 700 nm.

35. The method of claim 23 wherein the developing is carried out in a lighttight container.

36. The method of claim 23 wherein said film is exposed to said radiant energy for about 2 up to about 30 seconds to develop a frame.

37. The method of claim 23 wherein said radiant energy absorbing material is localized to particular spatial regions in said film.

38. The method of claim 23 further including an optical or magnetic reader to read optical or magnetic information from said thermal film.

39. The method of claim 38 further including controlling thermal processing in response to data magnetically or optically stored on said thermal film.

40. The method of claim 23 further including an optical or magnetic writer to write optical or magnetic information onto said thermal film regarding thermal processing or optical scanning conditions.

41. The method of claim 23 wherein the radiant energy absorbing material comprises more than one radiant energy absorbing material.

42. The method of claim 41 wherein said more than one radiant energy absorbing material comprises at least two dyes sensitive to different wavelength radiation.

43. The method of claim 31 wherein radiant energy absorbing material is incorporated into said thermal film that have absorption spectra that match the emission spectra of said radiant energy source.

44. The method of claim 31 wherein said radiant energy absorbing material does not substantially absorb radiation between optical wavelengths of 400 to 700 nm.

45. The method of claim 43 wherein said radiant energy absorbing material does not substantially absorb radiation between optical wavelengths of 400 to 700 nm.

46. The method of claim 23 wherein said radiant energy absorbing material absorbs radiation having an optical wavelength greater than 700 nm.

47. The method of claim 43 wherein said radiant energy absorbing material absorbs radiation having an optical wavelength greater than 700 nm.

* * * * *

UNITED STATES PATENT AND TRADEMARK OFFICE

CERTIFICATE OF CORRECTION

PATENT NO. : 6,464,412 B1

DATED : October 15, 2002

INVENTOR(S) : Timothy W. Stoebe et al.

It is certified that error appears in the above-identified patent and that said Letters Patent is hereby corrected as shown below:

Column 37,

Line 28, delete “photothernal” and insert -- photothermal --

Signed and Sealed this

Twenty-fifth Day of February, 2003

JAMES E. ROGAN

*Director of the United States Patent and Trademark Office*